United States Patent
Li et al.

(10) Patent No.: US 12,250,259 B2
(45) Date of Patent: *Mar. 11, 2025

(54) AUTOMATIC DIAGNOSTICS ALERTS

(71) Applicant: Conviva Inc., Foster City, CA (US)

(72) Inventors: Yan Li, Foster City, CA (US); Rui Zhang, San Mateo, CA (US); Henry Milner, Burlingame, CA (US); Jibin Zhan, San Mateo, CA (US)

(73) Assignee: Conviva Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,483

(22) Filed: Aug. 2, 2023

(65) Prior Publication Data

US 2024/0040206 A1     Feb. 1, 2024

Related U.S. Application Data

(63) Continuation of application No. 17/308,942, filed on May 5, 2021, now Pat. No. 11,765,437, which is a
(Continued)

(51) Int. Cl.
| | | |
|---|---|---|
| *G06F 15/16* | (2006.01) | |
| *H04L 65/1066* | (2022.01) | |
| *H04L 65/612* | (2022.01) | |
| *H04L 65/80* | (2022.01) | |
| *H04N 21/442* | (2011.01) | |
| *H04N 21/647* | (2011.01) | |
| *H04L 9/40* | (2022.01) | |

(52) U.S. Cl.
CPC .......... *H04L 65/80* (2013.01); *H04L 65/1066* (2013.01); *H04L 65/612* (2022.05); *H04N 21/44245* (2013.01); *H04N 21/647* (2013.01); *H04L 63/1425* (2013.01)

(58) Field of Classification Search
CPC ........... H04N 21/647; H04N 21/44245; H04N 21/2225; H04N 21/2402; H04N 21/251; H04N 21/4882; H04N 21/6473; H04L 65/1066; H04L 65/612; H04L 65/80; H04L 63/1425; H04L 41/0636; H04L 41/064; H04L 41/0686
USPC ...................................................... 709/231
See application file for complete search history.

(56) References Cited

U.S. PATENT DOCUMENTS

| | | |
|---|---|---|
| 7,536,396 B2 | 5/2009 | Johnson |
| 8,762,564 B1 | 6/2014 | Philpott |
| (Continued) | | |

OTHER PUBLICATIONS

Ahmed et al., Suffering from Buffering? Detecting QoE Impairments in Live Video Streams, 2017 IEEE 25th International Conference on Network Protocols (ICNP), 2017.
(Continued)

*Primary Examiner* — Vivek Srivastava
*Assistant Examiner* — Karina J Garcia-Ching
(74) *Attorney, Agent, or Firm* — Van Pelt, Yi & James LLP

(57) ABSTRACT

Generating automatic diagnostics alerts is disclosed. At a first time, a set of quality metrics for a plurality of groups of streaming sessions is computed. An anomaly is identified at least in part by performing anomaly detection using the set of quality metrics and historical information. A cause of the identified anomaly is diagnosed. An alert is generated based at least in part on the diagnosis.

23 Claims, 16 Drawing Sheets

Related U.S. Application Data continuation of application No. 15/994,534, filed on May 31, 2018, now Pat. No. 11,044,533.

(60) Provisional application No. 62/514,672, filed on Jun. 2, 2017.

(56) References Cited

U.S. PATENT DOCUMENTS

| | | |
|---|---|---|
| 9,451,306 B2 | 9/2016 | Sarukkai |
| 9,509,710 B1 | 11/2016 | Barry |
| 10,791,367 B1 | 9/2020 | Ganjam |
| 11,375,273 B2 | 6/2022 | Ganjam |
| 2003/0187986 A1 | 10/2003 | Sundqvist |
| 2004/0078470 A1 | 4/2004 | Baumeister |
| 2005/0083844 A1 | 4/2005 | Zhu |
| 2006/0282225 A1* | 12/2006 | Sunshine ........... G01N 33/0075 702/121 |
| 2007/0002897 A1 | 1/2007 | Goshen |
| 2007/0263984 A1 | 11/2007 | Sterner |
| 2007/0288518 A1 | 12/2007 | Crigler |
| 2008/0225706 A1 | 9/2008 | Lange |
| 2009/0054074 A1 | 2/2009 | Aaron |
| 2010/0161417 A1 | 6/2010 | Mitsui |
| 2010/0161424 A1 | 6/2010 | Sylvain |
| 2011/0225608 A1 | 9/2011 | Lopatecki |
| 2012/0150639 A1 | 6/2012 | Li |
| 2012/0278331 A1 | 11/2012 | Campbell |
| 2012/0311126 A1* | 12/2012 | Jadallah ................. H04L 65/80 709/224 |
| 2013/0014137 A1 | 1/2013 | Bhatia |
| 2013/0080264 A1 | 3/2013 | Umeda |
| 2013/0227648 A1 | 8/2013 | Ricci |
| 2014/0040020 A1 | 2/2014 | Kumar |
| 2014/0160941 A1 | 6/2014 | Hui |
| 2014/0321311 A1* | 10/2014 | Groenendijk ........... H04L 41/12 370/252 |
| 2014/0337871 A1 | 11/2014 | Garcia De Blas |
| 2014/0351840 A1 | 11/2014 | Andrade |
| 2015/0170196 A1 | 6/2015 | Meir |
| 2015/0195126 A1 | 7/2015 | Vasseur |
| 2016/0062950 A1 | 3/2016 | Brodersen |
| 2016/0112894 A1 | 4/2016 | Lau |
| 2016/0156520 A1 | 6/2016 | Scully |
| 2016/0164761 A1* | 6/2016 | Sathyanarayana .... H04L 41/046 709/219 |
| 2016/0170818 A1 | 6/2016 | Zhu |
| 2016/0232538 A1 | 8/2016 | Papakostas |
| 2016/0241927 A1 | 8/2016 | Kilar |
| 2017/0126476 A1 | 5/2017 | Curtin |
| 2017/0127108 A1 | 5/2017 | Kar |
| 2017/0171252 A1 | 6/2017 | Xue |
| 2017/0188094 A1 | 6/2017 | Ionescu |
| 2017/0223036 A1* | 8/2017 | Muddu ................ G06V 10/225 |
| 2017/0244777 A1 | 8/2017 | Ouyang |
| 2017/0250882 A1 | 8/2017 | Kellicker |
| 2017/0323326 A1 | 11/2017 | Kim |
| 2018/0100784 A1 | 4/2018 | Patil |
| 2018/0278487 A1 | 9/2018 | Mermoud |
| 2018/0288461 A1 | 10/2018 | Funk |
| 2019/0045235 A1 | 2/2019 | Giladi |
| 2019/0102553 A1 | 4/2019 | Herwadkar |
| 2019/0308509 A1 | 10/2019 | Herman |

OTHER PUBLICATIONS

Krishnan et al. Understanding the effectiveness of video ads: A measurement study. Proceedings of the ACM SIGCOMM Internet Measurement Conference, IMC. 149-162. 10.1145/2504730.25047 48. (Year: 2013).

Li et al., A Modified Inhomogeneity Measure in Spatial Distribution, 2013 Seventh International Conference on Innovative Mobile and Internet Services in Ubiquitous Computing, 2013, pp. 371-374 (Year: 2013).

Manferdini et al., Cross-Check of Analysis Modules and Reasoner Interactions, Oct. 30, 2014.

Padmapriya et al., Impact of malicious node on secure incentive based advertisement distribution (SI BAD) in VAN ET doi:http://dx.doi.org/10.1109/IACC.2017 (Year: 2017).

Xing et al., Face Tracking Based Advertisement Effect Evaluation, 2009 2nd International Congress on Image and Signal Processing, 2009, pp. 1-4 (Year: 2009).

Zhang et al., Bus-Ads: Bus Trajectory-Based Advertisement Distribution in VANETs Using Coalition Formation Games, IEEE Systems Journal, vol. 11, No. 3, pp. 1259-1268 (Year: 2017).

Ke et al., "Scalability of routing advertisement for QoS routing in an IP network with guaranteed QoS", Globecom '00—IEEE. Global Telecommunications Conference, Conference Record (Cat. No.00CH37137), vol. 1, 2000, pp. 605-610.

Pinnaka et al., "Cost Performance Analysis of Intrusion Detection System in Mobile Wireless Ad-Hoc Network," 2013 3rd IEEE International Advance Computing Conference (IACC), 2013, pp. 536-541.

* cited by examiner

| Alerts | | | | |
|---|---|---|---|---|
| Manual | AI Alerts | | | |

Alerts — 802 — 804 — 806 — Sensitivity Controls — 808 — Enter timezone — e.g. Average Bitrate 🔍

| Metrics | Value | Root Cause | Cumulative Impacted Unique Devices | ▼Time Alert Fired |
|---|---|---|---|---|
| Rebuffering Ratio | 4.4% | iphone and AKAMAI and Live | 202 | 19:21, May 07 2018 |
| Rebuffering Ratio | 5.2% | Flash and Unknown CDN and Live | 343 | 19:21, May 07 2018 |
| Exits Before Video Start | 32.2% | AKAMAI and Live | 723 | 19:13, May 07 2018 |
| Rebuffering Ratio | 4.6% | AKAMAI at Philadelphia | 147 | 18:56, May 07 2018 |
| Rebuffering Ratio | 5.9% | Verizon | 191 | 18:54, May 07 2018 |
| Rebuffering Ratio | 6.0% | T-mobile | 207 | 18:48, May 07 2018 |
| Rebuffering Ratio | 1.8% | Live | 1.32k | 18:21, May 07 2018 |
| Rebuffering Ratio | 2.8% | iphone and AKAMAI and Live | 450 | 18:18, May 07 2018 |
| Rebuffering Ratio | 3.4% | Flash | 445 | 18:17, May 07 2018 |
| Rebuffering Ratio | 3.3% | Flash and Unknown CDN | 245 | 18:16, May 07 2018 |
| Rebuffering Ratio | 6.9% | Android and AKAMAI | 282 | 18:14, May 07 2018 |
| Video Start Failures | 61.9% | All Traffic | 1 | 16:25, May 07 2018 |
| Video Start Failures | 3.1% | Android and AKAMAI and Live | 19 | 22:32, May 06 2018 |

AUTOMATIC DIAGNOSTICS ALERTS

CROSS REFERENCE TO OTHER APPLICATIONS

This application is a continuation of U.S. patent application Ser. No. 17/308,942, entitled AUTOMATIC DIAGNOSTICS ALERTS filed May 5, 2021 which is incorporated herein by reference for all purposes, which is a continuation of U.S. patent application Ser. No. 15/994,534, entitled AUTOMATIC DIAGNOSTICS ALERTS filed May 31, 2018, now U.S. Pat. No. 11,044,533, which is incorporated herein by reference for all purposes, which claims priority to U.S. Provisional Application No. 62/514,672, entitled AUTOMATIC DIAGNOSTICS ALERTS filed Jun. 2, 2017 which is incorporated herein by reference for all purposes.

BACKGROUND OF THE INVENTION

Over the top, online video streaming (OTT) over the Internet has been rapidly growing. For example, in addition to mediums such as traditional cable television, many content publishers are placing their videos online. In some cases, some content may only be watched online. The growth of OTT video streaming has increased to the point that online video traffic now consumes a large portion of global Internet traffic.

Delivery of content such as videos involves many entities and many distribution paths. Any entity along any of the content distribution paths may fail silently, at any time, directly causing degradation of the viewing experience. Improved techniques for handling failures in a content distribution ecosystem are needed.

BRIEF DESCRIPTION OF THE DRAWINGS

Various embodiments of the invention are disclosed in the following detailed description and the accompanying drawings.

FIG. 8 illustrates an embodiment of a reporting interface for a particular content publisher.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
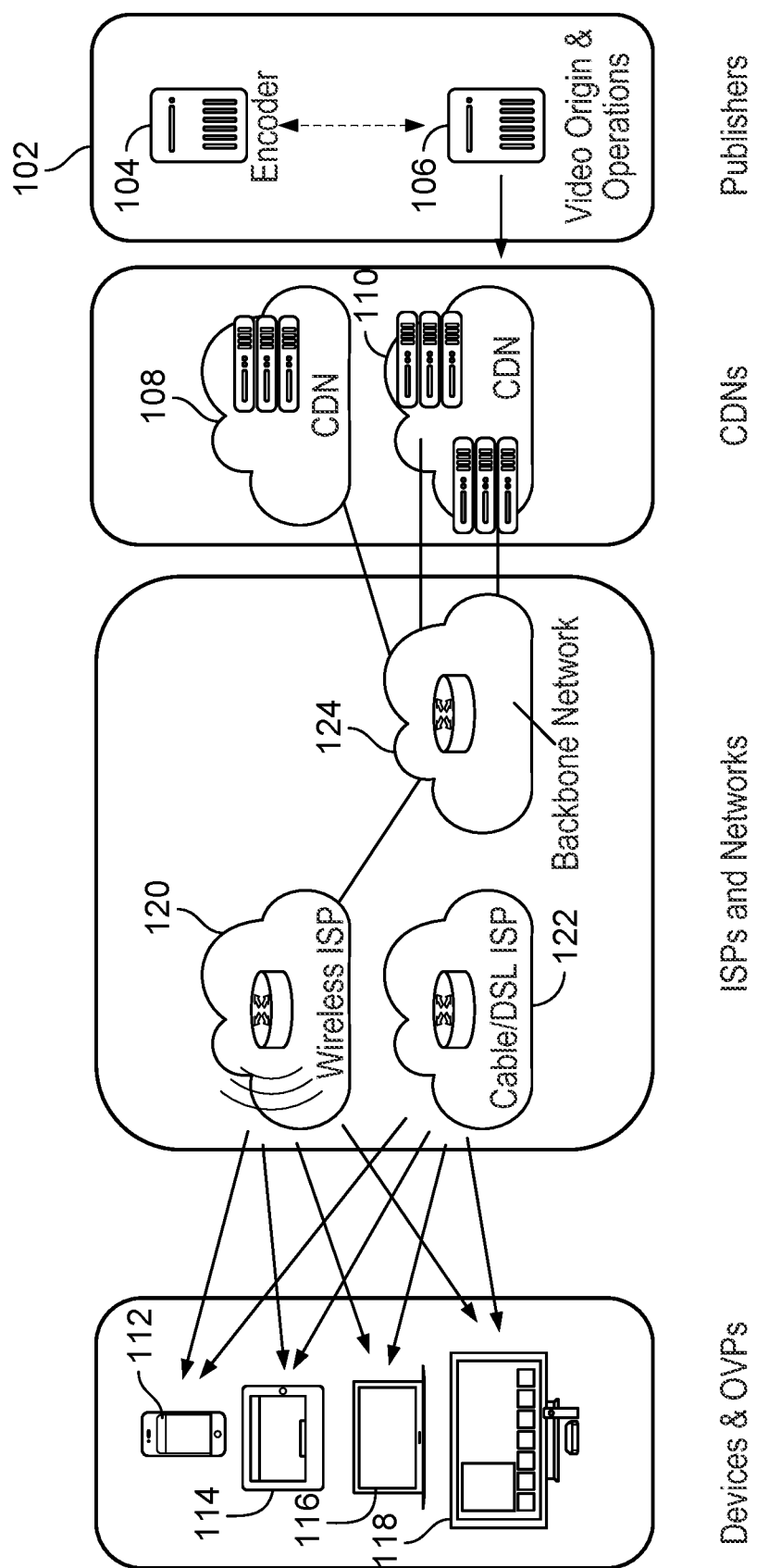
FIG. 1 illustrates an embodiment of a video streaming pipeline.

FIG. 1 illustrates an embodiment of a video streaming pipeline. Content delivery may involve many parties and many paths, with no single end-to-end owner. An example of a simplified streaming pipeline (that does not include entities such as content management systems (CMS), digital rights management (DRM), or ads) is shown in FIG. 1. Publishers 102 produce data (e.g., raw content) and encode the data (e.g., using encoder 104). The encoded versions of the raw content are then placed on origin servers (106), which are typically owned by the publisher.

Edge servers of content delivery networks (CDNs 108 and 110), which act as a form of cache layer for the content, then pull content from the origin servers if an edge server receives a request from a content player, but does not have the requested content item.

On the client side, a variety of devices, such as smartphone 112, tablet 114, laptop 116, and set top box 118 may be used to play the video content. Other types of devices such as gaming consoles and smart televisions may also be used to play video content. The player on each device sends requests to the CDN server through different Internet service providers (ISPs), such as wireless ISP 120 and Cable/DSL ISP 122, in order to stream the content. The requested content is fetched from the edge servers, passes through backbone network 124 and the ISPs, and is ultimately delivered to the client devices to be played.

As shown in the example of FIG. 1, there are many entities and many paths, with no single end-to-end owner of the entire content distribution pipeline. Any entity in the pipeline could fail at any time, directly causing degradation in the quality of the video experience of the end users of the client devices.

For example, suppose that the video player of a device has a bug which causes many viewers using the device to buffer for a long period of time in the middle of video playback. In this scenario, if it can be determined that only the iPhone is the issue, and not any other device or entity in the delivery pipeline, then the device player can be debugged and the issue resolved.

Typically, however, issues may occur on many entities along the streaming pipeline. For example, consider the scenario in which users are watching a live event on different devices—smartphones, desktops, and set top boxes. The devices stream from multiple CDNs, where each CDN has its own live encoder. Suppose that the encoding for a first CDN, CDN 108, has an issue and no more data can be pushed to CDN 108 after a certain point, causing all devices streaming from CDN 108 to buffer for an extended period of time. In this case, high buffering ratio would be observed on CDN 108, as well as on many types of devices.

As described above, there is no single end-to-end owner of the content delivery pipeline. The various parties and entities involved in the content delivery pipeline typically are separate and do not work with each other. If there are any issues that occur in the content delivery pipeline, this fragmentation of the ownership of the pipeline makes issues difficult to debug, and even more difficult to fix. For example, even if an ISP in a certain region observes that there is bandwidth congestion, the ISP issue would not be visible to the publisher. The publisher, who is concerned with the experience of end viewers, would have no idea the cause of issues with end viewers whose streaming experience is suffering due to the ISP congestion problem.

Thus, it is challenging to detect and determine the root cause of the issues in a content delivery pipeline. Viewing quality has a large impact on viewer engagement. For example, a 1% increase in rebuffering ratio (the percentage of time a user spends in buffering, after the video starts) can cause viewers to spend less time watching content, as well as causing increased churn (which will continue to increase as viewers' expectations continue to increase). Without detecting issues and determining their root cause, effective actions cannot be taken, and the quality of viewers' experiences will continue to suffer while the issue remains unidentified, and therefore, unresolved.

Using the techniques described herein, anomalies or issues along the streaming pipeline are detected, and the root cause of the detected anomalies is identified. A single issue may manifest itself in multiple, different areas. For example, a problem with video encoding may trigger issues at the CDN level, the device level, etc., resulting in multiple anomalies arising in different components in the streaming pipeline, even though the video encoding is the actual, single root cause of all the issues that are seen across the various components. Thus, even if anomalies can be detected, it can be difficult to understand where the true cause of the issue lies so that appropriate actions can be taken to resolve the issue. Using the root cause diagnosis techniques described herein, even if multiple anomalies are detected, the anomalies may be reconciled, and a single root cause of the anomalies may be determined. The detected anomalies and their diagnosed root causes may then be reported to various entities in the streaming pipeline, informing them of detected problems and where the source of the problems is.

Further, using the techniques described herein, the anomaly detection and root cause diagnosis is performed in near-real time (e.g., at minute granularity). Detecting quality issues in the viewing experience of many viewers, diagnosing the root cause among the many entities in the content delivery pipeline, and providing rich supporting metadata to aid in troubleshooting (e.g., by sampling impacted views with rich metadata and using time series of aggregated metrics) in near-real time allows for issues and their causes to be identified quickly, ensuring good viewing experiences and maximizing viewer engagement.

While example embodiments in a video streaming (e.g., live and on-demand streaming) ecosystem are described below, the techniques described herein can variously be adapted to accommodate any type of audiovisual or multimedia content distribution, as applicable.

Figure 2A:
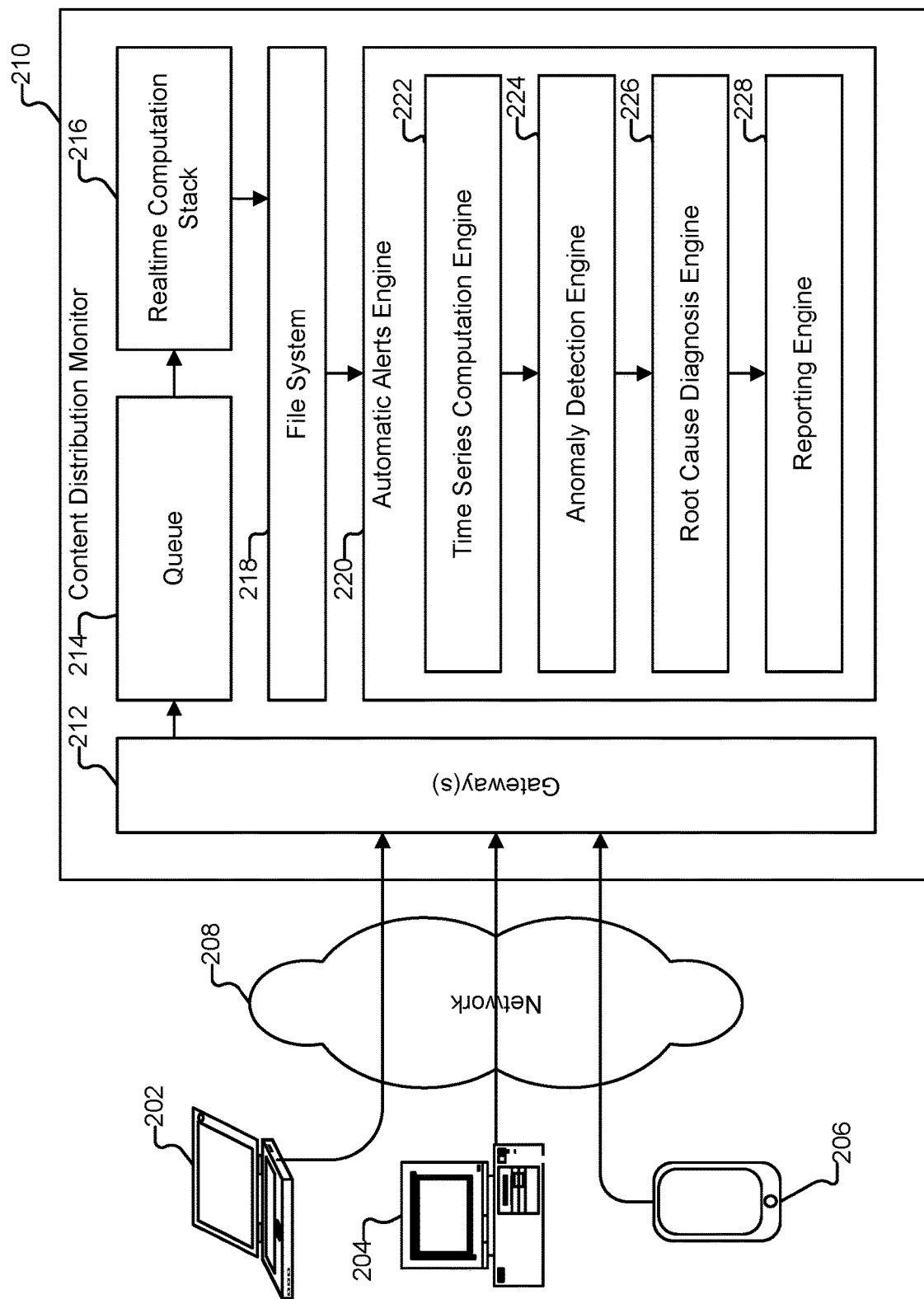
FIG. 2A illustrates an embodiment of an environment in which anomalies in a video streaming pipeline are identified and the root causes of the identified anomalies are diagnosed.

FIG. 2A illustrates an embodiment of an environment in which anomalies in a video streaming pipeline are identified and the root causes of the identified anomalies are diagnosed. In this example, devices 202-206 include video players used to play streaming content (e.g., whether live or video on demand (VoD)). Each player has running a sensor. The sensors continuously monitor the quality of the viewing experience for individual video sessions and send the measurements periodically back to content distribution monitor 210 (e.g., over network 208, such as the Internet). In this example, the quality of experience (QoE) measurements are sent in the form of heartbeats. The heartbeats may be sent periodically to the content distribution monitor (e.g., every 20 seconds).

In various embodiments, a heartbeat includes a session identifier (of the session for which the measurements are taken). The heartbeat also includes raw measurement data. The raw measurement data is used to compute QoE metrics, such as rebuffering ratio, video startup failure, exit before video start, etc. For example, a heartbeat may contain buffering time and playing time measurements, which are then used to compute the rebuffering ratio metric. The heartbeat also includes metadata about the session, such as the client device type (e.g., iPhone, Android, desktop, laptop, etc.) the operating system of the client device, the version of the operating system, the asset being played during the session, whether the content is live or VoD, the CDN (e.g., Akamai, Level3, etc.) from which the asset is being streamed, and an Internet Protocol (IP) address of the client device. In some embodiments, the Internet service provider (ISP) (e.g., Comcast, AT&T, Verizon, etc.) used by the client device is derived from the IP address of the client device.

Content distribution monitor 210 is configured to monitor the quality of the viewing experience of the video sessions, optimize the quality of the viewing experience, and maximize the viewer experience. Various entities may utilize the services of the content distribution monitor. For example, ISPs, CDNs, Publishers, etc. may be customers that consume the services provided by the content distribution monitor.

As shown in this example, the heartbeats transmitted from the various devices are received by gateway(s) 212. As one example, a gateway is implemented as a hypertext transfer protocol (HTTP) gateway server. The heartbeats are then placed on queue 214. In one embodiment, queue 214 is implemented as a Kafka queue.

The queued heartbeats are then passed from queue 214 to real-time computation stack 216 (also referred to herein as the "live" stack). The real-time computation stack is configured to summarize the incoming measurements on a per-video session basis (i.e., generate summarized session data per session—as identified by a session identifier in a heartbeat). In some embodiments, monitor 210 includes a second stack for handling historical information (e.g., previously captured session information).

The summaries are then written to a file system 218. In one example, file system 218 is implemented as a distributed file system such as the Hadoop Distributed File System (HDFS), where the summaries are to be consumed by other applications and processes.

In one example embodiment, the summarized heartbeat entries are stored in files in HDFS. Each file stored in HDFS contains a list of sessions for a specific minute. The session in a file may have various attributes including metadata and quality metrics, such as the following example metadata and quality metrics:

Metadata:
  Identifiers about the viewer: Viewer ID, Device ID (Client ID), Session ID
  Metadata about the video such as the name of the video asset, stream URL (Uniform Resource Locator), etc.
  Device metadata, such as the name/version of the device used to play the video, the name/version of the operating system, the name/version of the player, etc.
  Geographic ("Geo") information: Country, state, DMA, city, longitude, latitude, public IP address of the devices, ISP, ASN, etc.
  CDN(s) used to play the video
  Custom metadata: for example, tags set by customers of the services provided by the content distribution monitor.

Quality Metrics
  Startup state: indicates whether, the video just started within the specific minute, the player is waiting for data to start playback, the session ended without playing any data, etc.
  Lifetime metrics: metrics that are measured since the start of the session such as total playing time, total buffering time, video startup time, average bitrate played since the start of the session, session start time, session end time, etc.
  Interval metrics: metrics measured within the corresponding minute such as playing time within the minute, buffering time within the minute, average bitrate played within the minute, etc.
  Errors encountered In this example, the summaries are consumed by automatic alerts engine 220. Automatic alerts engine 220 is configured to automatically detect and diagnose issues in (near) real-time. Automatic alerts engine 220 further includes time series computation engine 222, anomaly detection engine 224, root cause diagnosis engine 226, and reporting engine 228. Automatic alerts engine 220 is configured to detect anomalies (and decide when to fire alerts), diagnose the root cause of the detected anomalies, and report the detected anomalies/diagnosed root causes. In some embodiments, the processing performed by automatic alerts engine 220 is repeated or performed on a time-driven basis (e.g., every minute).

The root cause of the detected issue may be a single dimension or a combination of several dimensions by which sessions may be grouped. The root cause that is identified may be a specific grouping of entities (or a single entity) in the content delivery pipeline that is determined to be the source of the issue. For example, the root cause could be diagnosed as the iPhone device type under the device dimension. As another example, the root cause could be diagnosed as the group of sessions using iPhones that streamed from the Akamai CDN.

The anomalies are detected with respect to the time series of various predefined QoE metrics, such as rebuffering ratio, video start failures (VSF), exits before video start (EBVS), and video startup time (VST) (i.e., it is detected whether there are anomalies in the behavior of those QoE metrics). In this example, for every grouping of sessions, all of the metrics are computed. The root cause of the detected anomaly is diagnosed to determine which specific group of entities (e.g., some specific device or some specific combination of device and CDN) is the source of the issue (which is determined for each QoE metric). The detected issues and identified root cause are then reported. For example, alerts are sent out.

An example of the processing performed by issue detection and diagnosis engine is as follows. The processing described herein as performed with respect to each predefined QoE metric of interest.

At each minute (or any other temporal granularity, as appropriate), time series computation engine 222 is configured to load, from file system 218, all of the session summaries from the last minute. Time series computation engine 222 continuously computes (e.g., at each minute) the set of Quality of Experience (QoE) metrics such as video start failure (VSF), exits before video start (EBVS), video startup time (VST), rebuffering ratio, etc., as described above. The aforementioned example metrics may be used to aggregate the quality experience from a large amount of collected video session data, which may be sent directly by software sensors integrated in client devices, as described above.

The aggregated QoE metrics are computed for groups of sessions at varying levels of granularity. The groups may correspond to sets of predefined dimensional attributes by which the sessions are grouped; for example, in various embodiments, sessions may be grouped according to their geo-locations (e.g., state, city, or Designated Market Area (DMA) in the United States), device type, as well as combinations of geo-location and device type. Other examples of dimensions that may be used for grouping sessions include: the name of a video asset that was played; the CDN from which the video data is streamed; whether the content is live or VoD (Video on Demand); and a user's or viewer's Internet Service Provider (ISP), or Autonomous System Number (ASN) within a given ISP.

The following is an example of dimensions and groupings.

Dimensions:
  CDN
  Device
  Live or VOD
  Asset
  ISP
  City
  CDN, Device
  CDN, Live or VOD
  Device, Live or VOD
  CDN, Device, Live or VOD
  CDN, City
  ISP, City
  CDN, ISP, City Groupings (there may be many groups per dimensions, and several examples are listed below per dimension, without limitation)
- CDN: Akamai, Level 3, Limelight, Edgecast, etc.
- Device: iPhone, iPad, FireTV, Roku, xBox, PlayStation, etc.
- Live or VOD: Live, VOD
- Asset: Game of Throne, The Americans, etc.
- ISP: Comcast, AT&T, RoadRunner, etc.
- City: San Francisco, New York, London, etc.
- CDN, Device: (Akamai, Roku), (Akamai, xBox), etc.
- CDN, Live or VOD: (Akamai, Live, Roku), (Akamai, VOD, xBox), etc.
- Device, Live or VOD: (Roku, VOD), (iPhone, Live), etc.
- CDN, Device, Live or VOD: (Akamai, Roku, Live), (Level3, iPhone, VOD), etc.
- CDN, City: (Akamai, San Francisco), (Level3, Chicago), (Akamai, Darmstadt), etc.
- ISP, City: (Comcast, Denver), (Verizon, Boston), etc.
- CDN, ISP, City: (Fastly, Verizon, Baltimore), (Akamai, Verizon, Boston), (Akamai, AT&T, San Diego), etc.

The various groupings are performed because issues may occur with respect to any of these groups, and any of these groups may be the source of the issue. The session data for the last minute may be grouped by the predefined dimensions, as shown above. For example, suppose that only the three dimensions CDN, Device, and ASN are under consideration. The different types of ways in which session may be grouped by (also referred to herein as "groupby types") would then be <ALL> (representing the group of all sessions/traffic), <CDN>, <DEVICE>, <ASN>, <CDN, Device>, <CDN, ASN>, <Device, ASN>, and <CDN, Device, ASN>, resulting in a total of $2^1=8$ types. Each type has the detailed dimension values or attributes filled in. As shown above, each dimension may have many different attributes or values.

As described above, in this example, at each minute, time series computation engine 222 computes the aggregated (e.g., average) QoE metrics per group from the numerous video sessions collected in the last minute. The computed QoE metrics for the minute are then combined (e.g., joined) with the QoE metrics computed for previous minutes to construct the time series per metric per group. A time series per group is also referred to herein as a "groupby" time series, as it is a time series computed for a subset or group of sessions that has been filtered according to a combination of dimension values or attributes. As one example, the QoE metrics computed for the minute are combined with the QoE metrics computed for the past 60 minutes, which have been cached (i.e., as historical information).

In some embodiments, smoothing of the time series is performed to eliminate noisy spikes caused by low attempts instead of real issues. The window size is made adaptive to the volume of attempts. To encode logic, an attempts threshold is set (e.g., 100) and a look back is done from the current minute until the threshold is met. When the attempts volume is large, the smoothing logic will not be triggered because each minute has enough attempts (exceeding the threshold).

Anomaly Detection

The time series constructed per metric per group (e.g., the time series constructed for rebuffering ratio for the group of <ALL> traffic, the time series constructed for rebuffering ratio for the group of sessions under <iPhone, Akamai>, etc.) are provided as input to anomaly detection engine 224. Anomaly detection engine 224 is configured to determine whether there is an anomaly detected in a time series for a metric for a group. For example, based on the evaluation of the time series for the rebuffering ratio metric for the group <iPhone, Akamai>, it is determined whether the group <iPhone, Akamai> is anomalous (i.e., the behavior of the buffering ratio metrics appears anomalous for sessions played on iPhone devices obtaining content from the Akamai CDN).

Statistical analysis may be performed on the constructed time series of the metrics to detect anomalies. One example of a technique for anomaly detection includes determining and using a baseline and threshold. A second example of a technique for anomaly detection includes using the Hidden Markov Model. The first approach using baselines and thresholds is described here. Further details regarding anomaly detection using the HMM will be described below.

Anomaly Detection Using Baselines and Thresholds

The QoE metrics may oscillate around a stable or stationary baseline over time. The time series may be modeled as a constant mean plus random noise. Whenever the noise portion exceeds a certain level, an issue is claimed to be detected, that is, an anomaly refers to a non-trivial spike in the time series of a quality metric.

In some embodiments, anomaly detection includes computing a baseline and deviation threshold for each QoE metric per group, for example, by aggregating QoE metrics for an extended period of time in which the metric appeared normal (e.g., as compared to a threshold value, such as video startup failure rate (VSF %)<0.5%). In one example embodiment, the baseline is the mean of the aggregated QoE metrics (per group) within the time period and the threshold is computed as a multiple of the standard deviation plus the baseline value.

In one embodiment, the mean of the QoE metric, per group, is computed using sessions (that are under the group) within a sliding window (e.g., last 40 hours) as a baseline. For example, the trending mean (or moving average) is used to compute a baseline for each metric on each group. In some embodiments, the values of the QoE metric of the time series are biased towards more recent data. For example, when computing the moving average, a high weight is assigned to the current minute. The weight is then decayed (e.g., exponentially) for the previous minutes (i.e., older data has less weight). As one example, an exponential decay rate of 0.998 is used, while maintaining a sliding window of 40 hours, $0.998\hat{\ }(40*60)$.

In some embodiments, a tolerance bandwidth is computed based on the computed standard deviation of the metric. For example, the tolerance bandwidth is computed as a multiple of the computed standard deviation. The tolerance bandwidth may be used to control alert sensitivity. In some embodiments, the tolerance bandwidth is configurable as a per customer parameter, as different customers may have different expectations and actions on alerts.

A tolerance threshold under which the metrics are considered normal is then also computed, where the tolerance threshold is computed based on the baseline and the tolerance bandwidth. In one embodiment, the tolerance threshold is the tolerance bandwidth above the baseline.

In some embodiments, when an issue is detected, the baseline and tolerance threshold are not updated, because they are used to capture the natural vibrations of metrics without issues occurring.

The deviation threshold (also referred to herein as an "issue detection threshold") is then used to detect issues for each QoE metric and group. The issue detection threshold may be based on the distribution of area above and below the tolerance threshold under normal situations. As one example, the area is configured based on the standard deviation and typical issue observation time. For example, the area threshold can be set to be 2*deviation*10 min. Both the height (number of standard deviations) and width (issue observation time) of the area can be adjusted.

A group is then marked or labeled as anomalous or "bad" if the metric at the current minute exceeds the tolerance threshold (e.g., there is a spike in rebuffering ratio that goes above the tolerance threshold). In some embodiments, a starting and ending time point of the issue is determined. Both starting and ending points are the cross points between the tolerance threshold and metric time series.

In some embodiments, the metric for the group having crossed or exceeded the threshold does not automatically trigger the labeling of the group as anomalous. For example, other factors are considered before the group is labeled as bad. For example, the impact of the detected event (crossing of the metric over the threshold) is computed. For example, the impact of the detected event may be computed in terms of time and the number of sessions that are impacted. Based on the impact, the group may then be labeled (or not labeled) as a true anomaly. The impact threshold for designating a detected event as a true anomaly is tunable. For example, different customers may tune their impact thresholds differently. One customer may decide that although the metric exceeds the threshold, only a small group of users are impacted, and the small impact is not significant enough for the event to be labeled or classified as an anomaly.

As one example, of taking into account the impact of an anomaly, if the QoE metric of the corresponding group at the current interval (e.g., one minute interval), or within a short period of time (e.g., 10 minutes) is above the deviation threshold for at least a configurable (threshold) time interval (e.g., 5 minutes), and there are at least a configurable (threshold) number of sessions (e.g., 100) considered "impacted" (i.e., the sessions for which the QoE metrics exceed the baseline+/−a multiple of the standard deviation) within that interval (5 minutes), the QoE metric of the corresponding group is labeled as anomalous, In some embodiments, the impact is used to determine whether an alert should be sent for an anomaly (e.g., if the impact is below a threshold, then no alert is sent). The frequency for detecting anomalies is configurable. The alerts may have different severity levels (e.g., "warning" and "critical"). The sensitivity of detecting anomalies and sending alerts may also be configurable.

An example of anomaly detection using baselines/thresholds is described in further detail below in conjunction with FIG. 3.

Anomaly Detection Using the Hidden Markov Model

A second example technique for anomaly detection is based on a hidden Markov model (HMM), an example of a Bayesian method for modeling time series. HMMs may be used to detect anomalies in metrics time series. HMMs may be used to determine the probability that an anomaly is happening within a particular group of sessions at any point in time.

In some embodiments, a separate HMM is used for each, per group, QoE metric. In this example, an HMM is a chain of states, one per interval (e.g., once per minute), with an associated metric observation for each interval. In this example, the state for the interval is a label to be inferred by the algorithm, either "ordinary" or "anomalous." These states are unknown (i.e., "hidden"), and the model may be used to infer these states using the observations (of QoE metric values). The states may be distinguished by the model for observations, which, in some embodiments, makes different predictions for metrics observed under the ordinary and anomalous states. If observations appear incompatible with the ordinary state for some stretch of time (e.g., the observations are extremely unlikely to happen under the ordinary state), the model finds a high probability that the group is in the anomalous state for that period. Inference may be performed on an interval (e.g., once per minute) using, for example, an algorithm such as the forward-backward algorithm.

One example of a model parameter is the distribution of observations (metrics) under the ordinary state (when there is no anomaly) and the anomalous state. In some embodiments, the ordinary distribution of metric values for each QoE metric and group is approximated as a Gaussian distribution. As one example, the mean of the Gaussian may be continuously re-estimated as an exponentially weighted moving average of previous metric observations when the group was in the ordinary state with high probability. The standard deviation may be approximated under a worst-case assumption by bounding the metric above and below. In some embodiments, the distribution of the metric in the anomalous state is taken to be a fixed Gaussian with a very large standard deviation. Another input to the model includes the probability of an anomaly.

In some embodiments, the use of HMM allows for the reporting of when an anomaly started (versus reporting that the anomaly happened when the detection happened).

The following is an example of an HMM model for anomaly detection. Take a group of sessions (e.g., all sessions for a customer, or any group of sessions under some groupby). Consider the metric, rebuffering ratio. In each minute, the average rebuffering ratio is observed for the sessions. The HMM is used to determine the "hidden" state—whether there is an anomaly. The HMM may be used to determine the probability that there is an anomaly at a certain time. An anomaly can then be reported if that probability exceeds some threshold (e.g., 0.5, 0.99, or 0.999). The HMM connects the observations of metrics and the hidden states. The HMM may also be used to determine the probability that an anomaly happened in each past time period, not just the current time period (e.g., current minute).

State Transitions

The following is an example of a Markov model for the hidden states at each time interval. Each state depends only on the previous state. The model is to be used to determine the probability that the metric at the current minute is anomalous given the state of the previous minute. In order to do so, two parameters are determined: (1) the probability that the current state is anomalous given that the previous state was ordinary; and (2) the probability that the current state is anomalous given that the previous state was anomalous. As one example, probability (1) is 0.0001 and probability (2) is 0.99, respectively. This would encode the assumption that there is an anomaly on average every 10,000 minutes, and that anomalies last on average 100 minutes.

Emissions

A model for the observed metrics, also referred to herein as "emissions" is also determined. For example, the metric (e.g., buffering ratio) is modeled as depending only on the current state. The distribution of the metric in the ordinary state and the distribution of the metric in the anomalous state are obtained. In one embodiment, because the ordinary state is common, the rebuffering ratio distribution when in the ordinary state may be estimated from recent session data. As described above, the metric's distribution in the ordinary state may be modeled as a Gaussian distribution. With respect to the anomalous state, in one embodiment, the metric is modeled as a uniform distribution, where any average rebuffering ratio is equally likely to occur.

Starting State

In some embodiments, because the anomaly detection is performed every minute (or at any other interval, as appropriate), the initial starting state may be set to the anomaly probability that was calculated for that time slice the previous time anomaly detection was run. The very first time that the HMM based anomaly detection is run, the starting state (e.g., probability that starting state was anomalous) can be set to a small number (e.g., 0.0001).

After detection of anomalies, root cause detection may then be performed. In one embodiment, the HMM anomaly detection approach produces anomaly probabilities for each group of sessions independently. The root cause detection may then use the anomaly probabilities as input.

While two example techniques for detecting anomalies were described above, other anomaly detection techniques may be used. For example, the baseline may be non-stationary, with "seasonal" changes, if a model of the baseline is used that supports the capture of such information. (This means, for example, that the normal value of the baseline changes based on time. For example, the model may capture the fact that there are typically many more people watching TV at primetime than in the early morning hours.) Other predictive algorithms (e.g., autoregressive-moving-average) may be used to predict the normal values and deviations for any specific time intervals and specific metrics based on the nature of the metrics.

Handling Groups with Small Numbers of Sessions

In some cases, small groups (groups with a small number of sessions) may not have enough traffic to reliably detect issues/anomalies (i.e., it may not be clear whether a small group has an anomaly or not because, for example, the group has very little traffic with a very spiky time series). This can impact the subsequent diagnosis processing.

In one example of anomaly detection, as described above, statistics are used to compute the baseline and threshold for detecting anomalies. However, for small groups that are not of a sufficient sample size, the threshold may be extremely large, and it is possible that anomalies may not even be able to be detected.

In some embodiments, the anomaly detection described above is limited to those groups that have sufficient traffic (e.g., where the number of sessions in the group exceeds a threshold) to make a reliable anomaly detection determination.

In another embodiment, machine learning is used to compensate for the lack of traffic data for a "small" group. As one example, a machine learning module is included in anomaly detection engine 224 to assist or aid in estimating the performance (e.g., average of a QoE metric) for such small groups for a given time interval (e.g., one minute interval).

Figure 2B:
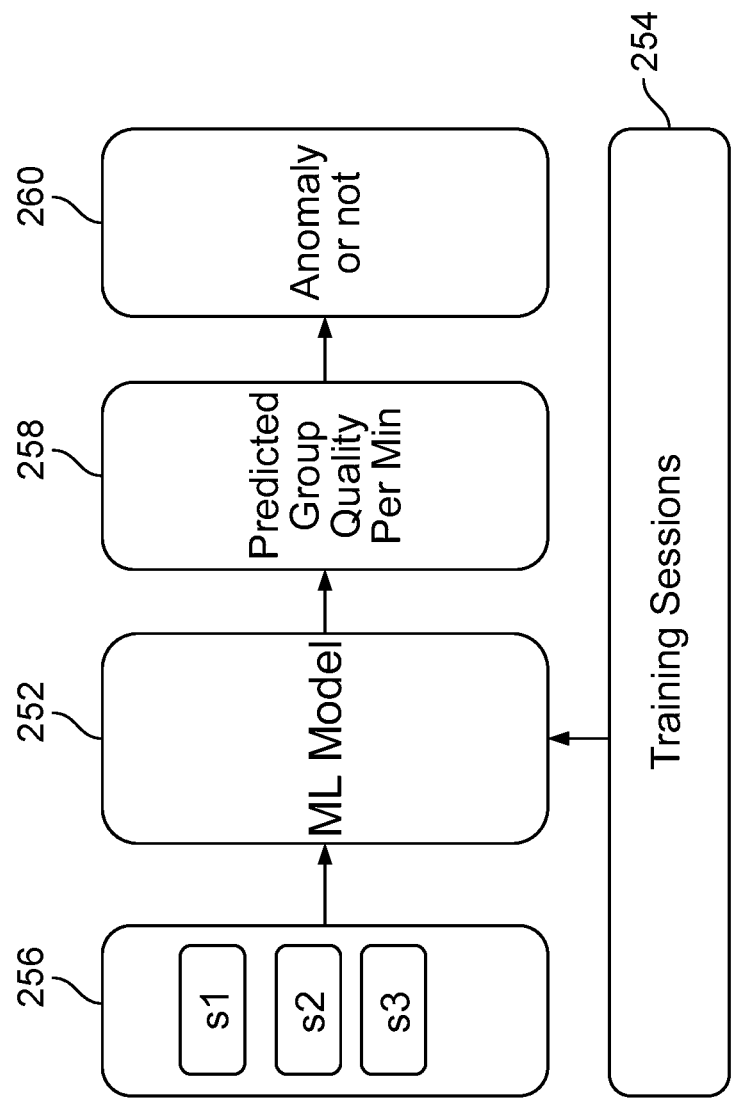
FIG. 2B illustrates an embodiment of a machine learning module for facilitating anomaly detection.

FIG. 2B illustrates an embodiment of a machine learning module for facilitating anomaly detection. In some embodiments, the machine learning module of FIG. 2B is a portion of anomaly detection engine 224. The machine learning module is used to determine the aggregate metrics for a "small" group (e.g., that includes less than a threshold number of sessions). In this example, a machine learning model 252 is trained based on all video sessions 254. At each minute (or any other interval of time, as appropriate), all of the sessions from the "small" group (256) are fed into the machine learning model to obtain an estimate of the group's performance (indicated by QoE metric value), as shown at 258. In this example, this results, minute by minute, in time series of the quality metrics for the "small" group. Thus, a time series of the metrics for this "small" group is generated/constructed. The anomaly detection techniques described above may then be used on the constructed time series to detect anomalies at 260.

Thus, information is pooled between smaller and larger groups. Similar sessions in large groups are used to assist in estimating the performance of the sessions in small groups. In some cases, the simpler average performance for a small group may be a poor estimate of the true average performance for that group at any one time. In these cases, machine learning techniques such as linear regression may be used to improve these estimates by partially pooling information between smaller and larger groups. Thus, similar sessions in a large group are used to estimate the performance of the sessions in the small group.

Root Cause Diagnosis

Root cause diagnosis engine 226 is configured to diagnose the root cause of the anomalies detected by anomaly detection engine 224. As described above, for a given time series metric, such as rebuffering ratio, the QoE metric is computed for every grouping. Anomalies may be detected in multiple groupings (i.e., spikes in rebuffering ratio may be detected in the time series of many groups), even if only one group is the source of the issue. This is because a single issue may manifest anomalies in multiple groups. That is, an issue in one component of the video delivery system may affect the aggregate metrics of multiple groups of video sessions. For example, an issue across an ISP that causes increased rebuffering may also cause increased rebuffering for every ASN, and an issue in a single ASN may potentially cause a noticeable increase in rebuffering for the entire ISP. Root cause diagnosis engine 226 is configured to solve this causal inference problem, finding the "root cause" of the detected anomalies, as will be described in further detail below.

As described above, the different groupings (ways to group sessions) are constructed as different combinations of dimensions (examples of which are described above), where different groupings are groupings of different numbers of dimensions. The different groupings have a hierarchical, parent/child relationship. For example, suppose that only the dimensions Device, CDN, and IsLive? (i.e., true if live, false if not live (e.g., VOD)) are considered. The possible combinations of these dimensions are:

Zero: <ALL>
Single: <CDN>, <Device>, <IsLive>
Double: <CDN, Device>, <CDN, IsLive>, <Device, IsLive>
Triple: <CDN, Device, IsLive>

In terms of levels of granularity and filtering of sessions by dimension(s), the single dimension groupings are children of all traffic. The double dimension groupings are the children of the single dimension level (e.g., <CDN, Device> and <CDN, IsLive> are children of <CDN>). The triple dimension grouping is a child of the double dimension level.

In some embodiments, when performing root cause diagnosis, a graph (also referred to herein as a "diagnosis graph") including the different groupings is constructed based on the parent/child relationship of the groupings, as described above. The root cause group is the one whose children are all bad or anomalous. In some embodiments, if the diagnosis is to be performed on behalf of a specific customer (e.g., publisher), then the diagnosis graph is constructed using only the traffic of that customer.

As one example, a directed acyclic graph (DAG) is constructed, where each node in the graph represents a group. The graph is constructed out of all of the groups based on the parent-child relationship between the groups. A group, as referred to in the example herein, represents the collection of video sessions defined by the dimensions of that group. Domain specific knowledge of the OTT video delivery ecosystem may be used to construct and prune the graph. For example, a group (CDN:Akamai, Device:AppleTV) may be constructed to represent all the video sessions that are playing video on an Apple TV device type and obtaining video from the Akamai CDN. In some embodiments, a group "A" is considered a parent of group "B" if "B" contains and matches all the dimensions of group "A" and has one more dimension than "A." For example, (CDN:Akamai, Device:AppleTV) is a parent of (CDN:Akamai, Device:AppleTV, ContentType:Live).

As one example of a graph, at the root is <ALL> traffic (i.e., the group containing all traffic in that minute, unfiltered by any dimensions). The next level is single dimension groupings. The next level is double dimension groupings. The next level is triple dimension groupings, and so forth. In the above example of three dimensions, there were eight combinations of patterns. If N dimensions are considered, the number of combination patterns would be 2 ^(N). In some embodiments, for scalability, certain dimensions, such as <Asset>, <DMA>, <ISP>, and <Asset, CDN> are excluded from the groupings used to generate the graph. As another example, certain dimensions are excluded from being combined with other dimensions to generate groupbys.

The following is an example of a process for performing root cause diagnosis by traversing or searching the diagnosis graph. First, the search of the graph is performed from left to right (i.e., using a breadth first search (BFS)) for the groups with issues/anomalies detected (with depth bound or group bound).

Next, whenever one such group is detected, a depth first search (DFS) is performed recursively (starting with the group) for all of its sub-groups to look for the root cause.

Next, in each DFS run, for each child group, the contribution (aggregated metrics) of all children to the parent is computed in both a normal period (e.g., the last 30 minutes without issue, which may be configurable) and during the issue period. If a child whose issue period contribution is much larger than its normal period contribution (e.g., 0.1, which may also be configurable), then the child is considered as one of the root causes. If none such child exists (i.e., the contribution difference vibrates around zero), then the parent is the root cause. Here, the increase of contribution indicates root cause, instead of absolute contribution.

In an alternative embodiment of determining when to stop the DFS search, instead of computing contribution before and after an anomaly is detected, the detection flag set by the previous BFS issue detection stage is used. If all children groups with significant amounts of traffic are marked as anomalous, then the parent is returned as the root cause. That is, if a group is claimed to be the root cause of an issue, then all of its children should be anomalous. For example, if <dimension_1, dimension_2, . . . , dimension_m> is the cause of the issue, all combinations such as <dimension_1, dimension_2, . . . , dimension_m, any other dimensions> would have the same issue. In another embodiment, the node itself is labeled as a root cause if more than a configurable (threshold) percentage (e.g., 80%) of children are labeled as anomalous as well. If a node satisfies the criteria, then the node is labeled as a root cause and the search moves forward to the next node on the BFS path. Otherwise, if the node is anomalous but does not meet the children criteria, then each individual child is recursively drilled down into using a DFS search. In a merging stage across different children groups, the child with maximum depth is selected as the root cause.

Next, in the DFS search, after all of the root causes of all the children groups are computed, the root causes are merged. If all children groups agree that the parent is the root cause, then the parent is returned as the root cause. Otherwise, the union of all children root causes without parent is returned, and the root causes are merged based on the parent-children relationship. In some embodiments, a single node child is blamed before the parent is blamed. For example, if <ALL> is diagnosed as the root cause and the customer uses a single CDN, then the algorithm should return the CDN as the root cause.

Next, all sub-groups searched in the DFS search are marked as "searched" so that the BFS search does not revisit these groups. In this way, each group would be visited exactly once by BFS (but may be visited multiple times by DFS).

In some embodiments, verification of the root cause diagnosis is performed. For example, after the cause of an issue is identified, the root cause group's performance can be replaced with its past good average to see if this resolves the issue.

Further details and examples of root cause diagnosis are described below.

Based on the anomaly detection and root cause diagnosis performed by anomaly detection engine 224 and root cause diagnosis engine 226, respectively, reporting engine 228 is configured to generate output such as alerts. As one example implementation, generated alerts are written to Phoenix to be pulled by a data application programming interface (API) for external usage. A push API can also be called to push the alerts to customers. Examples of alerts include emails or pages that are sent to customers or users.

As one example, an alert includes a link, that when clicked on, provides detail about the alert (e.g., by pointing back to the content distribution monitor). Various information is then provided, such as the detected anomaly, the identified root cause, as well as additional information that may be used for troubleshooting, such as information/metadata for a subset of sessions that are affected by the detected/diagnosed issue.

The provided information may also include a representation (e.g., plot) of the time series for the metrics in which anomalies were found (e.g., two hours of data—one hour before the alert was fired, and one hour after). This would allow the user to see when a metric begins to degrade, as well as the severity of the degradation. Users can then also view what the numerical value of the metric was when the alert was fired.

The cumulative impact of an issue may also be presented, for example, by displaying the number of sessions or unique devices that were impacted since the issue was detected. For example, a threshold may be set to quantify the impacted users in normal situations (without alerts/anomalies), suppose $95^{th}$ percentile (defining only 5% of users are impacted). The $95^{th}$ percentile is then used as a threshold to analyze how many users exceed the threshold when an alert happens (an anomaly is detected).

The determination of what sessions are impacted may vary depending on QoE metric. For example, for metrics such as EBVS and VSF, the impacted session is defined as any session with EBVS or VSF. In one embodiment, for rebuffering ratio and video startup time, the impacted session is defined as a session whose rebuffering ratio or video startup time exceeds a tolerance threshold (as described above). In some embodiments, if the tolerance threshold is not known when computing distribution buckets in groups, a linear interpolation is performed to approximate the percentage impacted. For example, suppose a tolerance threshold of rebuffering ratio is 3%, which falls within the bucket (2%, 5%) with corresponding percent (80%, 50%), then the percent impacted is 50%+(3%-2%)*((80%-50%)/(5%-2%)) =60%.

Rich metadata for at least some of the affected or impacted devices may also be shown. For example, metadata for a random subset of the affected devices may be presented. The additional details provided in the metadata can be used to facilitate troubleshooting.

For example, while the dimensional attributes of the group that was identified as the root cause are provided, the user may also wish to see what specific assets (e.g., pieces of video content) were being streamed at the time, what the streaming URL was, or what were the versions of a specific device in the identified root cause group (e.g., to see if there is a certain plugin that is affecting video streaming). Another example of additional metadata that may be provided is the IP address of CDN edge servers. This information would allow a customer that is a publisher to alert the CDN of the IP addresses that are problematic. The CDN provider may then use the information to correlate from their side if there any issues with their edge servers.

The alert may also include a severity rating, which may be based on how many people were impacted by the issue, as well as how long the issue lasted. For example, the severity may be specified at different levels, such as critical, warning, or information. This allows the user to have greater insight into the detected anomaly so that the appropriate actions may be taken.

Additional examples of output, such as reports and interfaces, are described in further detail below.

The issue detection/diagnosis (per metric per group) processing described above is performed on a periodic basis (e.g., every minute, or any other appropriate granularity) to provide near real-time fault detection and diagnosis. At each interval, the processing is performed with respect to each of the QoE metric. For example, at the next minute, new summarized session data is received from the live stack. All the metrics are computed for all the groups for that next minute, where are then combined with the cached QoE metrics computed for the previous minutes to generate updated time series per metric per group. Anomaly detection and root cause diagnosis are then performed on the updated time series. This may result in new issues and/or new root causes being determined every minute.

Thus, if there is an issue in the content delivery pipeline, there is a one minute latency to detect the issue and report the detected issue. This provides immediate, near real-time issue detection, diagnosis, and reporting, which allows for customer of the service to be notified of the issues with as little latency as possible so that the issues can be fixed as soon as possible. This is beneficial for the streaming environment, where any issues can cause loss in viewer engagement.

The time granularity may be adjusted. For example, if an ISP is a customer utilizing the services provided by the automatic alerts engine, the time series granularity may be changed from one minute to one hour.

An example illustrating how the near real-time processing is performed using the distributed computing platform, Spark, is described in further detail below.

Further details and examples of Anomaly Detection

Example Anomaly Detection

Figure 3:
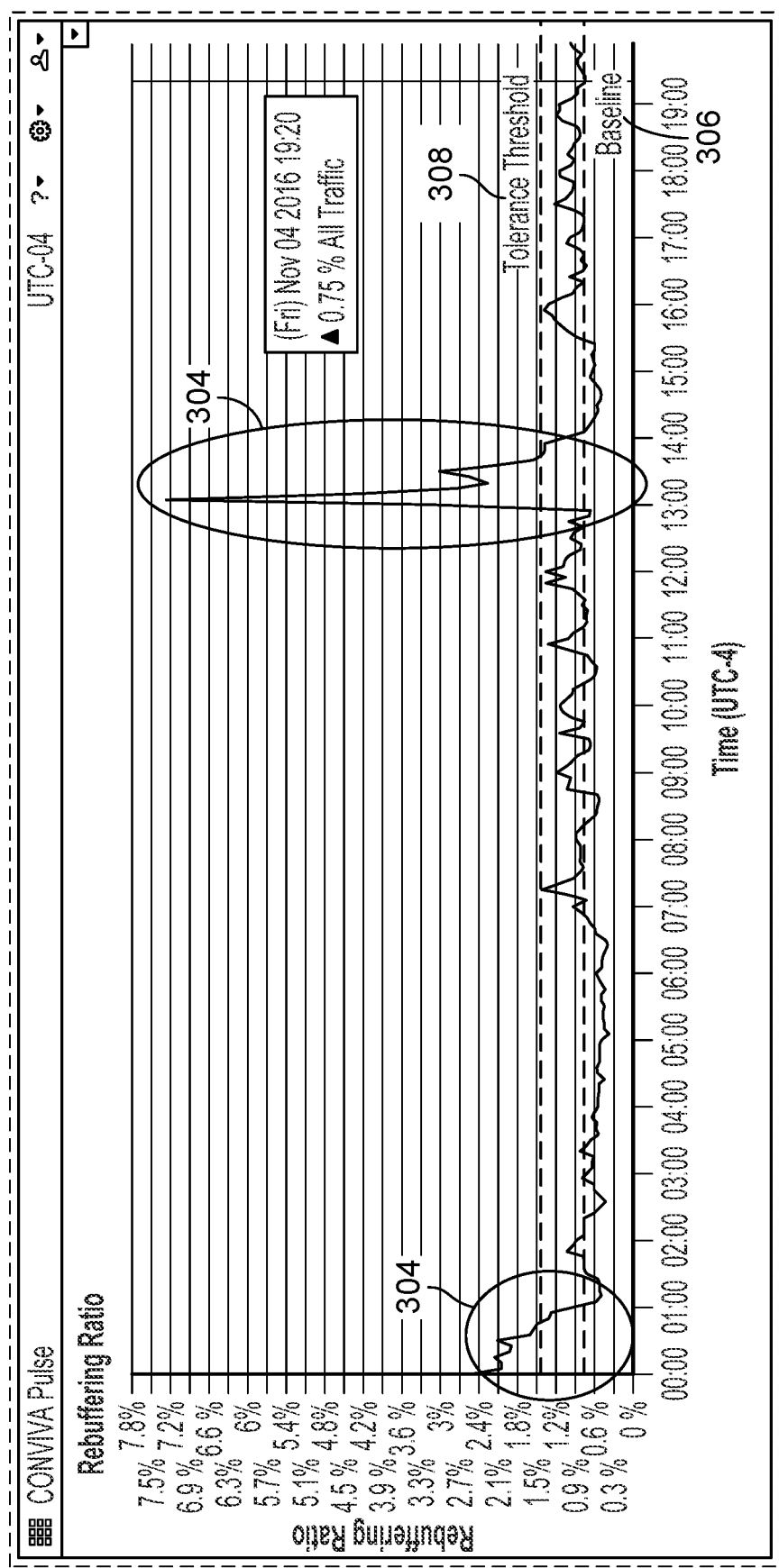
FIG. 3 illustrates an embodiment of detecting an anomaly.

FIG. 3 illustrates an embodiment of detecting an anomaly. In this example, a time series of the rebuffering ratio QoE metric for the group of all traffic is shown. At 302 and 304, two spikes are shown, a smaller spike (302) and a larger spike (304). The larger spike at 304 has a larger impact on video quality, as compared to the small spike at 302. In this example, the spikes are captured/detected as anomalies using the baseline/threshold anomaly detection technique described above.

First, a baseline 306 is computed. As described above, the baseline is computed based on the trending mean of past historical data. Then, above the baseline, a tolerance threshold (308) is computed. In this example, the tolerance threshold is computed as being several standard deviations above the baseline, as described above. The rebuffering ratio is considered as "normal" (or not anomalous) when it is beneath or under the tolerance threshold.

Next, above the tolerance threshold, the area of each spike is computed to determine the impact of the issue. In this example, the computed area is an integration over the time dimension and the metric dimension, where both dimensions are used to characterize the impact. For example, while a spike may be small in height (small in terms of rebuffering ratio value), it may last for a prolonged period of time, resulting in an overall large impact on video quality. On the other hand, a spike that is short in time duration may still have a high peak rebuffering ratio, also resulting in a large impact. Thus, the area under the spike is used to reflect the impact.

In this example, if the computed area exceeds an area threshold, then the spike is determined to be an anomaly. In some embodiments, the area threshold is user-configurable. This allows users to configure and control how alerts are generated/transmitted. For example, the user can make adjustments to have more alerts, or to only capture the most serious anomalies (e.g., those that have the largest impact, or an impact that exceeds a configurable threshold). This control may be delegated to customers because the determination of whether a spike is anomalous or not depends on the customers' definition of impact. For example, one customer may choose to only define the large spike at 304 to be anomalous, because the small spike 302 has a trivial impact on their video quality. On the other hand, a different customer may wish to capture both small spike 302 and large spike 304 as anomalies.

Further Details and Examples of Root Cause Analysis

As described above, content delivery issues may occur for at any dimension, or any combination of several dimensions. If only anomaly detection were performed, many anomalies might be detected (since issues may manifest in many groups), without identifying which group is actually at the root of the detected anomalies.

Figure 4:
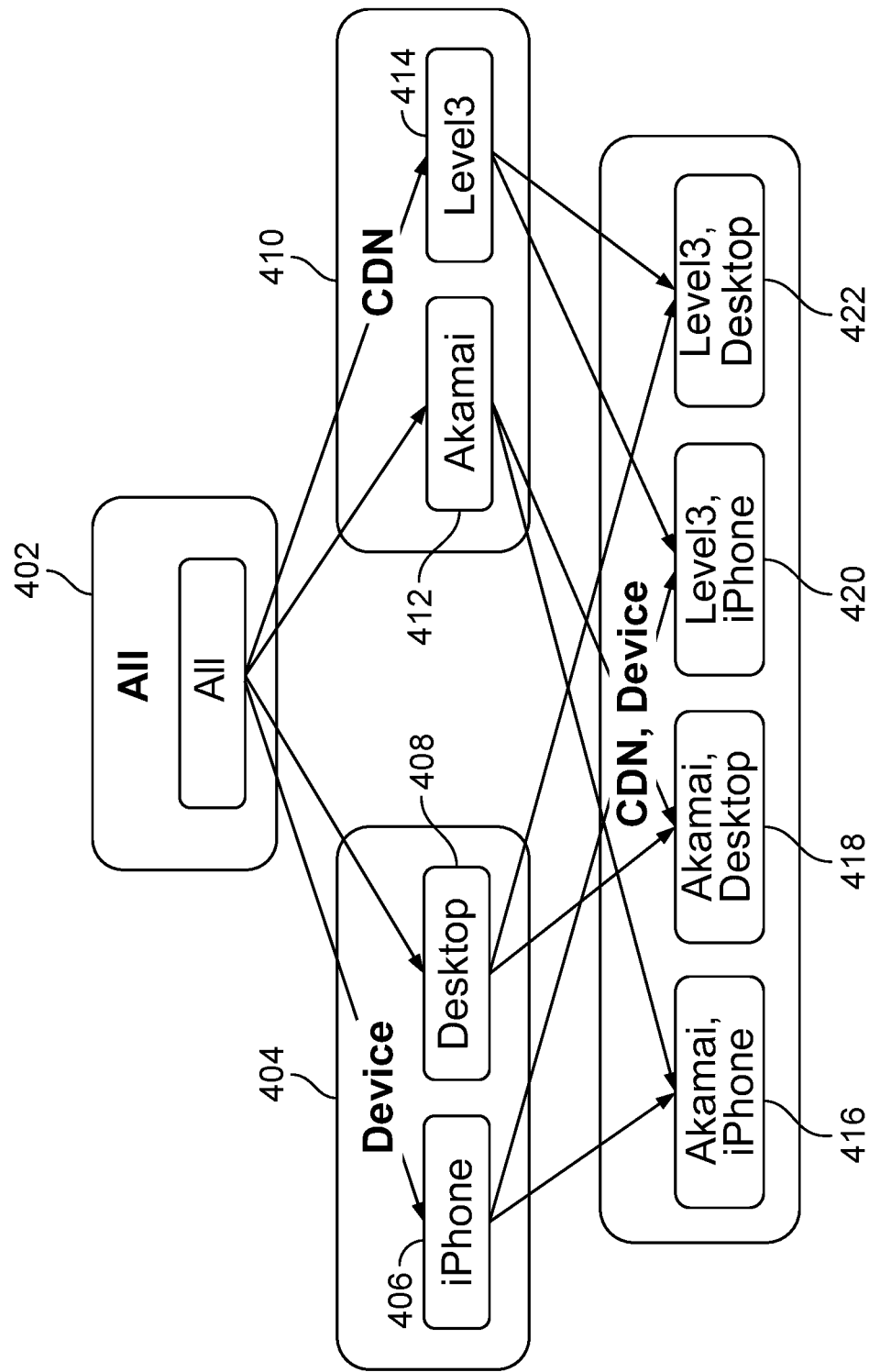
FIG. 4 illustrates an embodiment of diagnosing a root cause of detected anomalies.

FIG. 4 illustrates an embodiment of diagnosing a root cause of detected anomalies. Shown in this example is a diagnosis graph that is constructed based on anomaly detection. At the root 402 of the graph is the "zero" dimension level representing all traffic.

The next level is the groupings of sessions that are grouped by single dimensions. For example, at this level are the device dimension groupings 404 and CDN dimension groupings 410. Within the device dimension are two groupings by specific devices (attributes of the device dimension), one for the grouping/filtering of sessions by iPhone (406), and one for the group of desktop sessions (408). The CDN dimension includes two groupings, one for the group of sessions streaming from Akamai (412), and one for the group of sessions obtaining content from the Level3 CDN (414). The groupings at the single dimension level are children of the all group at 402.

The next deeper level includes groupings by two dimensions. In particular, in this example, this level includes groupings of sessions that are grouped by both CDN and Device dimensions. The groupings <Akamai, iPhone> (416), <Akamai, Desktop> (418), <Level3, iPhone> (420), and <Level3, Desktop> (422) are the pairs/combinations of devices (406-408) and CDNs (412-414). Each grouping at this level is a child of two parents (one device and one CDN).

Thus, as shown in this example, when performing root cause diagnosis, a diagnosis graph (e.g., directed acyclic graph) is constructed, where each node represents a group (grouping of sessions), such as <iPhone> or <Akamai, iPhone>. The group <Akamai, iPhone> represents the group of traffic that uses iPhones and streams from Akamai, and is the intersection of the sessions that use iPhones and the sessions that stream from Akamai. The links between the nodes indicate a parent-child relationship. A parent group is split into multiple subgroups. The split may be performed according to various dimensions. For example, the group <iPhone> is split into the subgroups <Akamai, iPhone> and <Level3, iPhone> by the CDN dimension. In this example, this split indicates that among all the video sessions that are played on the iPhone, some of them stream from Akamai, and the remainder stream from Level 3. The parent group is the union of all its child subgroups.

In the example shown, the groupings <iPhone> 406, <Akamai, iPhone> 416, and <Level3, iPhone> 420 have been detected as anomalous using the anomaly detection techniques described herein.

If the iPhone device has issues, it may affect all the CDNs from which iPhone devices stream from. For example, both groups <Akamai, iPhone> and <Level3, iPhone> are affected. Although anomalies are detected in both these two groups, these two groups should not be blamed or diagnosed as the root cause. Instead, the iPhone device should be blamed or diagnosed as the root cause (because in this example, both of its children were anomalous).

In this example, when performing diagnosis, among all the groups that are detected as having anomalies, only the group whose subgroups are all "bad" (such as iPhone in this example) is diagnosed as being the root cause (and the source of the issue). The other groups 416 and 420 are merely affected by the issue with iPhones, and are not the root cause.

The following describes an example systematic approach of the root cause diagnosis performed by evaluating or traversing the diagnosis graph of FIG. 4. The diagnosis graph is constructed. The graph provides the searching structure for the root cause diagnosis.

After the graph is built, root cause analysis is performed for all groups in the graph independently. Those groups that are detected as having an anomaly (e.g., detected as described above using baselines/thresholds, HMM, etc.) are marked as anomalous or "bad" (e.g., the groups 404, 416, and 420 in the graph).

After marking the groups that are anomalous, a search is performed from the top level to the bottom of the graph. Whenever an anomalous group is visited, a recursive drill down is performed to search for the root cause. The search ends when a group is identified whose subgroups are all bad. That group is then returned as the root cause. In the example of FIG. 4, all subgroups of iPhone are bad, and thus the group <iPhone> is diagnosed as the root cause.

Figure 5:
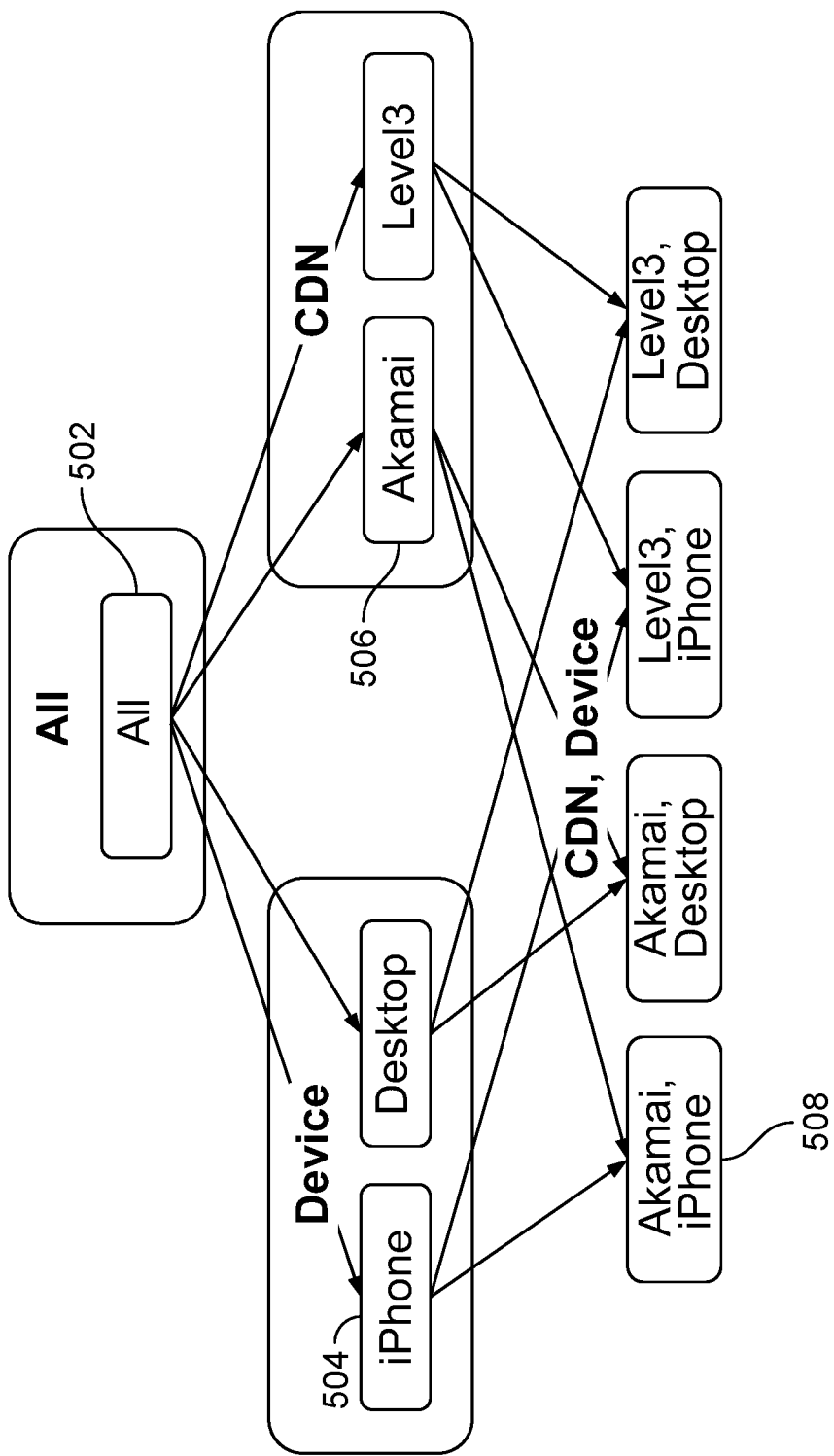
FIG. 5 illustrates an embodiment of diagnosing a root cause of detected anomalies.

FIG. 5 illustrates an embodiment of diagnosing a root cause of detected anomalies. An example of a diagnosis graph is shown in FIG. 5, which includes the same nodes as the graph shown in FIG. 4. In this example, different groups have been found to be anomalous. In this example, an anomaly has been detected in the <All> group (502) at the top level (i.e., anomalies were found in the group of all traffic/streaming sessions). A search is performed on the diagnosis graph of FIG. 5 to determine a root cause of the detected anomalies.

Since the anomaly was detected in the <All> group, a recursive drill down of the <All> group is performed. At the next level, for each dimension (single dimension group-bys at this level) Device and CDN, the groups within each of the dimensions are evaluated to determine how many of the groups within a given dimension are anomalous. As part of the drill down, anomalies in the subgroups <iPhone> (504) and <Akamai> (506) are found in the dimensions Device and CDN, respectively. However, not all of the devices and not all of the CDNs were anomalous. Thus, the <All> group is not the root cause (otherwise all of the groups within a dimension would have been anomalous, since their union would cover all traffic).

The search then forks, and recursive drill downs are performed on both <iPhone> and <Akamai>. Both <iPhone> and <Akamai> point to their common subgroup <Akamai, iPhone> (508), for which an anomaly has also been detected. That is, both search paths ended at the same node. Thus, the group <iPhone, Akamai> is determined to be root cause. In this example, the <All> group was flagged as anomalous because of the large proportion of traffic being streamed by iPhones, which would have a large impact on the average rebuffering ratio that is computed across all traffic.

If <Akamai> were the root cause, then the group <Akamai, Desktop> should also have been detected as anomalous, which is not the case in this example. Likewise the group <iPhone> is not the root cause either, otherwise the group <Level3, iPhone> would also have been anomalous, which is also not the case.

Further Details Regarding Constructing the Diagnosis Graph

From the examples of FIGS. 4 and 5, it can be seen that the diagnosis result depends on the structure of the diagnosis graph (e.g., what nodes are included in the graph). In other scenarios, there may be many more dimensions and combinations of dimensions to consider, resulting in a more complex searching structure.

In some embodiments, the diagnosis graph that is constructed is not a full graph that includes all possible nodes and all possible combinations of dimensions, as the size of the graph would make the diagnosis traversal difficult to compute. In some embodiments, pruning is performed to boost performance. For example, not every dimension is considered when constructing the graph. Not every combination of dimensions is necessarily considered, as well. For example, while combinations of <device, CDN>, <City, ISP>, and <CDN, City> may be considered (the combination of City with ISP and CDN may be used to help localize ISP and CDN issues to certain geographical cities/regions), other combinations such as <device, ISP and <device, city> are not combined to form further subgroups because those combinations are not as meaningful when diagnosing an issue. As another example, the combination of the asset dimension with other dimensions is not computed, due to scalability and complexity issues (because of the numerous different pieces of content that could be streamed), when generating the diagnosis graph. In some embodiments, what dimensions/combinations of dimension are considered when constructing the diagnosis graph is predefined/configurable.

In some embodiments, the graph is constructed starting from groups identified as anomalous. In one embodiment, each group is represented or defined or identified by a group identifier (group ID). The group ID acts as a key for the session data for a group. (The group ID will also be used to provide various performance enhancements, as will be described in further detail below) The group ID, which, in one embodiment, is a hash of the dimension attributes/groups to which the session belongs, also indicates the relationship among the groups. As described in the examples of above, the root of the graph is all traffic for the customer. Starting from the anomaly groups, a connected graph that connects the anomalous groups is constructed. For example, the anomaly groups are first gathered. The parents of the anomaly groups that are required for the graph to be connected are obtained to construct the graph.

Merging Multiple Identified Root Causes

In the example of FIG. 5, both search paths gave the same unique root cause. In some cases, multiple search paths may result in multiple, different root causes being returned (this may be an artifact or consequence of an incomplete graph being constructed and used for diagnosis for efficiency/complexity reasons). However, this is potentially the same issue manifesting itself in multiple places.

Various techniques may be used to resolve the multiple identified root causes. As one example, the group at the end of the longest search path is returned as the root cause. In some embodiments, a similarity analysis is performed between identified root causes to determine whether they can be merged and a single root cause can be identified. As one example, the similarity is determined by checking, for each of the root cause groups, the similarity of the unique impacted sessions for those groups.

As one example, a count of the impacted unique devices by each issue is computed (e.g., by using hyperloglog (HLL)). The amount of overlap between the different identified root causes is evaluated to determine whether the root causes may be merged or one root cause can be excluded (in the example of FIG. 5, both search paths were the same length but returned the same subgroup—i.e., same group of sessions—therefore, that subgroup was returned as the single root cause group). In some embodiments, the times of detected issues are determined to combine multiple root causes. In some cases, the metric time series of the identified root causes is compared to determine the similarity of those root causes. The determined similarity is then used to decide if the root causes should be combined or excluded.

Example Spark Implementation of Automatic Alerts

In one embodiment, automatic alerts engine 220 is implemented on the Apache Spark distributed computing framework (e.g., using a Spark cluster). For example, the processing performed by the automatic alerts engine is performed on a Spark cluster of computing nodes to achieve high scalability.

For example, the QoE metrics computed per group per minute are computed in a distributed manner. However, while the diagnosis is performed on a per-customer basis (e.g., when constructing the diagnosis graph), the QoE metrics computed per group are not computed on a per customer basis. Thus, shuffling will need to be performed at some point. Shuffling is an expensive action to take in Spark computations. Described herein are optimizations that may be performed to reduce the shuffling.

Figure 6A:
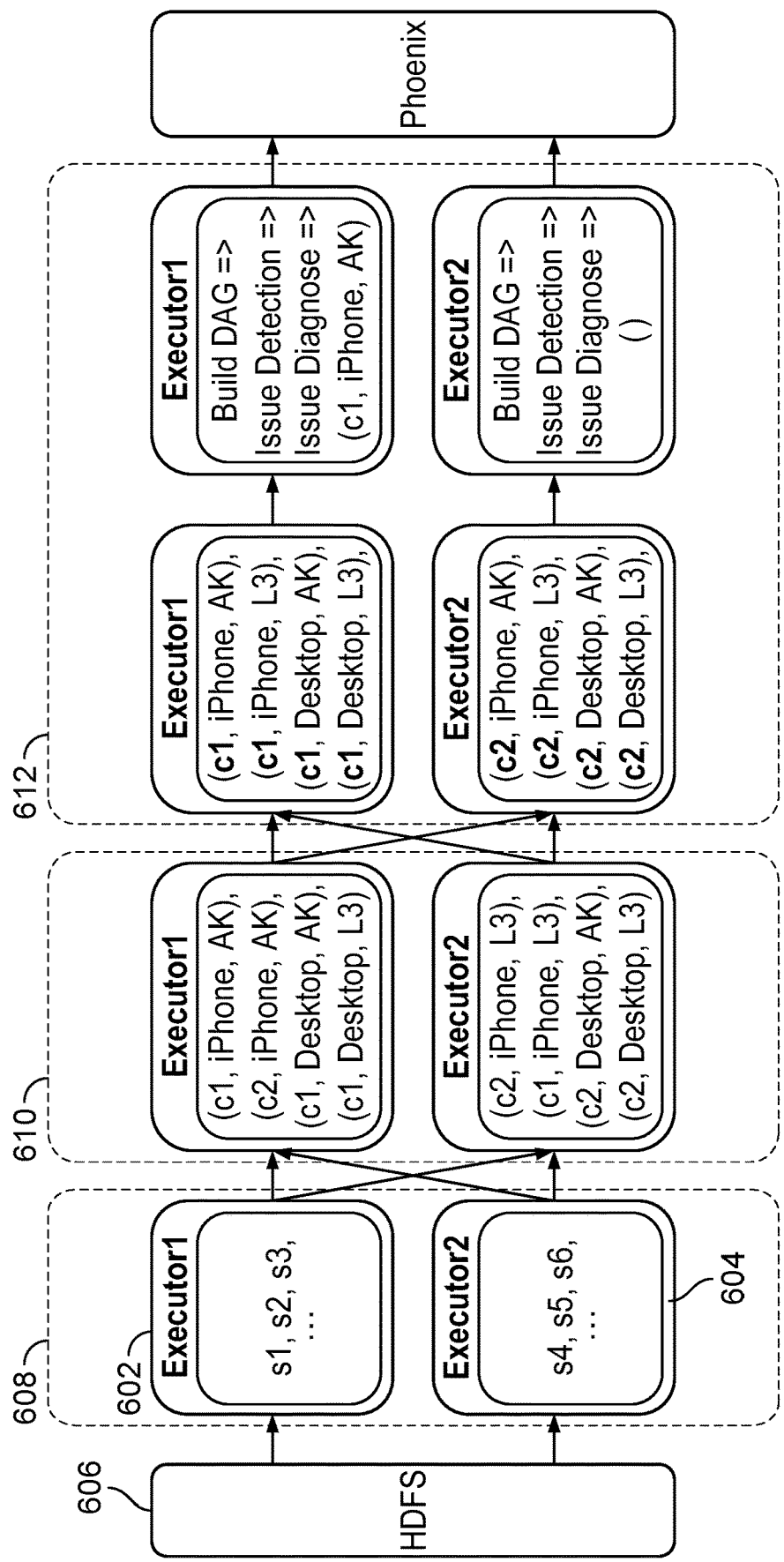
FIG. 6A illustrates an embodiment of a distributed anomaly detection and root cause diagnosis processing pipeline.

FIG. 6A illustrates an embodiment of a distributed anomaly detection and root cause diagnosis processing pipeline. In the example of FIG. 6A, a distributed version of the anomaly detection and root cause diagnosis processes described above is shown using the Spark framework. In some embodiments, the processing described in conjunction FIG. 6A is used to implement automatic alerts engine 220.

In this example, suppose two executors, 602 and 604. The executors are included in worker machines of a Spark cluster (also referred to herein as "worker nodes"). In one embodiment, the executors are implemented as java virtual machines (JVMs) within the machines. Each worker node may have several executors running at the same time.

In this example, each executor is associated with a set of CPU (central processing unit) cores. For example, each executor is assigned three cores. Suppose a machine/worker node has 16 processing cores. The worker node may have five executors (using 15 of the 16 cores), where the $16^{th}$ core is reserved for other tasks, such as input/output (I/O). Other configurations may be implemented. The number of machines/worker nodes (and therefore executors) in the cluster is scalable and configurable.

In this example, at stage 608 of the processing pipeline, each executor reads/loads video sessions from HDFS 606 (e.g., file system 218). HDFS 606 holds all of the summarized session data for the last minute. As described above, the summarized session data is stored in files (where each entry in a file corresponds to the summarized session data for a given session in the last minute), where the summarized session data for the last minute may be partitioned across multiple files in HDFS. As described above, each file stored in HDFS contains a list of sessions (and their corresponding summarized session data) for a specific minute, where the session in a file may have various attributes such as metadata and quality metrics.

In some embodiments the summarized session data for the sessions observed in the last minute are distributed randomly among the files in HDFS. For example, the summarized session data is distributed according to a client identifier that was randomly assigned to client devices (where the client identifier identifies a specific device). For example, summarized session data is distributed to the files of HDFS based on a hash of the client ID. In some embodiments, the number of files into which the summarized session data is distributed is fixed. If data for more sessions is received in a certain minute, then each file becomes larger and includes more entries. The number of files into which to distribute summarized heartbeat data may also be configurable.

In this example, at stage 608, each core/executor receives a partition of data. For example, each core fetches data from HDFS 606. This includes loading files into the cores. In some embodiments, in order for all cores to load data at the same time (e.g., to increase parallelism), files may be split (e.g., entries in a single file may be loaded onto different cores). Each partition is computed/processed by a task assigned to a core of a machine, which is decided by the Spark scheduler.

At this stage, the predefined QoE metrics are computed on a per session basis. That is, for each session, a given sessions' summarized heartbeat data is used to compute video start failure, exit before video start, buffering ratio, and video startup time for that individual session. The individual session metrics will be used to compute aggregate group level metrics.

In order to do so, a group identifier (group ID) is determined for each session. The groups by which sessions are grouped are based on a defined list of dimensions for the groups, such as [CDN, ISP, City]. The sessions are then assigned group IDs that are based on the group attributes which corresponds to the list of dimensions defined for the group. For example, if a group is defined by the dimensions [CDN, ISP, and City], then the attributes used to define a specific group and create a group ID would be, for example, [Akamai, AT&T, San Francisco].

Thus, each session is assigned or mapped to a group ID based on its dimensional attributes. For each session, the set of predefined QoE metrics is also computed.

At this stage, the sessions are randomly distributed, and thus a single partition may have sessions with many different group IDs. In order to compute group level metrics, it would be beneficial to have all sessions in the same group (e.g., with the same group ID) aggregated into the same partition.

In order to do so, the randomly distributed sessions are shuffled so that sessions of the same group are collocated or stored in the same partition. In some embodiments, the group ID is used as a key to determine which partition a session is stored in. Thus, after computing the individual session metrics, the sessions are then grouped together into the same partitions according to the group ID key. As one example, a hash partitioner is used in Spark to determine the partition for each session, where the hash partitioner computes the hash of the Group ID for the session, and the function "hashcode mod numPartitions" is used as the partition id of the session/element.

In some embodiments, prior to the shuffling a local reduce may be performed to merge together (e.g., average) the metrics for sessions in the same group that happened to be in the same partition. The local reduce reduces the amount of data that will be transferred during shuffling.

Once the sessions are shuffled so that sessions within the same group are stored in the same partitions, the group level metrics are then computed at stage 610. This includes merging the metrics of those sessions that belong to the same group. For example, if there were ten sessions in a group being processed in a partition, those ten sessions are merged into a single entry (e.g., corresponding to the group ID that the ten sessions belong to), where the individual metrics of the ten sessions are, for example, averaged to determine an aggregate QoE metric that is assigned to the group ID. Thus, each group ID is associated with a set of aggregate/merged metrics for the corresponding group. In some embodiments, the QoE metrics are computed for all groups defined in the diagnosis graph.

With sessions in the same groups collocated in the same partitions and merged together to determine per-group aggregate QoE metrics, time series are also constructed per group, per-metric. For example, the group level metrics computed for the current minute are joined with the group level metrics of the previous 60 minutes to generate the time series.

After the time series is constructed using the aggregate metrics, anomaly detection and root cause diagnosis are performed. In one embodiment, the anomaly detection and root cause analysis are performed on a per-customer basis. When determining the aggregate metrics, the partitions included data from the same groups (that had previously been grouped by group ID). However, some groups stored in the same partition may be associated with different customers.

In this example, before performing the per-customer anomaly detection and root cause analysis, the aggregate group level metrics, which are distributed into partitions based on group ID, are reshuffled according to customer identifier (ID) (e.g., the identifier of a publisher utilizing the services of content distribution monitor 210). The customer identifiers are indicated by "c1" and "c2" in the example of FIG. 6A. This second shuffle is performed to place together, in the same partition, aggregate group-level metrics/time series that belong to the same customer. For example, all groups from the same video publisher are placed in the same executor.

Anomaly detection and root cause diagnosis is then performed on the reshuffled data, where, as shown in this example at stage 612, each executor processes data specific to a certain customer (e.g., executor 1 processes data for customer 1 ("c1"), while executor 2 processes data for customer 2 ("c2")). The processing performed by the executors at this stage includes performing anomaly detection as described above. The root cause analysis includes generating diagnosis graphs and traversing the graphs to identify root causes of detected issues, as described above. The results of the anomaly detection and root cause analysis are then persisted, for example, into a database (e.g., Phoenix).

In some embodiments, as described above, when constructing the diagnosis graph, the full graph including all possible combinations of dimensions is not constructed. Rather, some dimensions are excluded (or excluded from being combined with other dimensions), and only those groups needed to construct the graph and perform the diagnosis are used. This makes the root cause diagnosis/analysis more lightweight (by reducing the size of the graph that needs to be traversed). This allows for the more efficient construction of the multiple graphs that are created for each of the predefined QoE metrics at each minute for each group.

In one embodiment, the graph building, anomaly detection, and root cause diagnosis are wrapped into a map function. In this example, the entire pipeline is a job that is fired at each minute (or any other temporal granularity, as appropriate) to provide near real-time anomaly detection and root cause diagnosis.

Generating Groups in Spark

In one embodiment, groups are computed in Spark and stored in RDDs (resilient distributed dataset), a data structure of Spark. The element of the Group RDD is the tuple of (Group ID, Group), where Group ID is used as the key to determine which partition the element should be stored in. In one embodiment, as described above, Spark uses a hash partitioner to determine the partition for each element, where the partitioner computes the hash of the Group ID of the tuple and the uses "hashcode mod numPartitions" as the partition identifier of the element.

An example data structure for Group ID is defined as the following pseudo code:

```
GroupId {
GroupBy mGroupBy;
Object[ ] mAttributes;
}
```

Where "mGroupBy" defines the list of dimensions for the group, such as [CDN, ISP, City], and "mAttributes" is the list of group attributes which corresponds to dimensions defined in "mGroupBy". For example, if "mGroupBy" is [CDN, ISP, City], "mAttributes" could be [Akamai, AT&T, San Francisco].

Figure 6B:
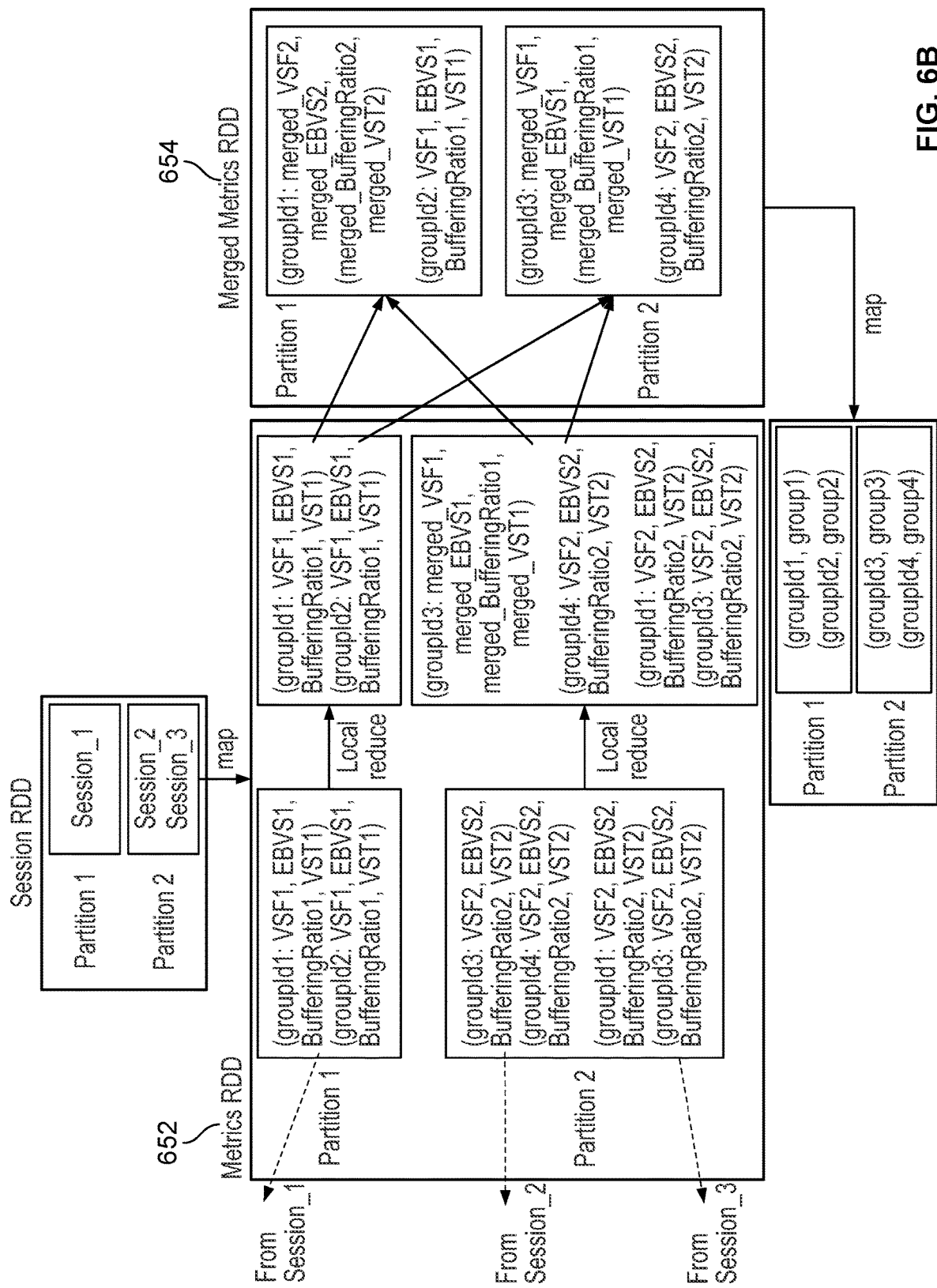
FIG. 6B illustrates an embodiment of determining group level metrics.

FIG. 6B illustrates an embodiment of determining group level metrics. In some embodiments, the processing described in FIG. 6B is used to implement stages 608-610 of FIG. 6A. In the example of FIG. 6B, an example of how Group RDD is generated is shown, as well as shuffling. In some embodiments, as described above, each partition is computed/processed by a task, which is assigned to a core of a machine, as decided by the Spark scheduler.

As illustrated in the example of FIG. 6B, each metric (e.g., video start failures (VSF), Exits Before Video Start (EBVS), Video Startup Time (VST), and Rebuffering Ratio (RBR)) per group is computed as follows. All metrics are computed per session per group (for that session) first (Metrics RDD 652). Then the metrics are shuffled based on the group ID and are merged for the same group, which generates the group-level metrics (Merged metrics RDD 654). The last step is to transform the merged metrics per group ID to groups.

Figure 6C:
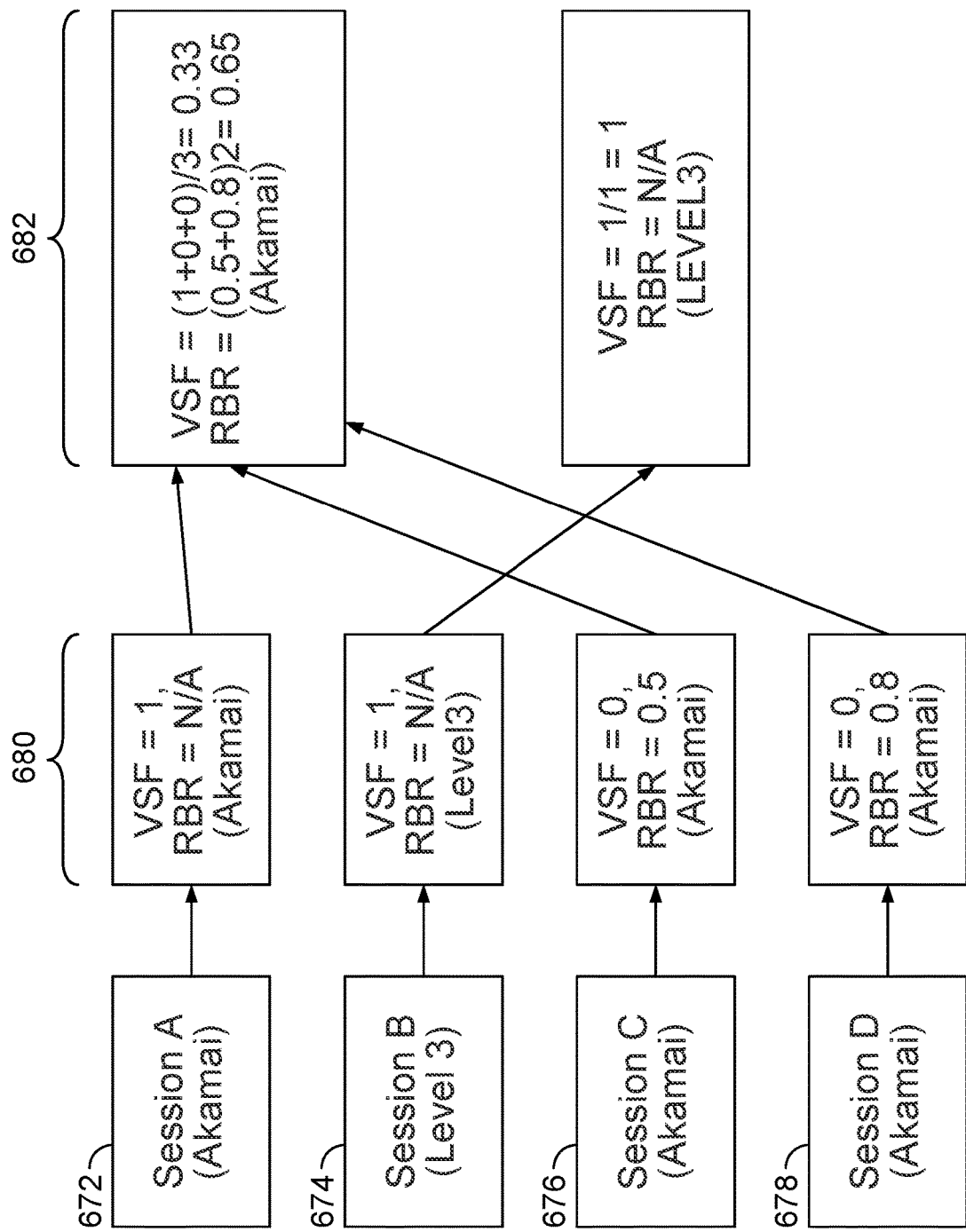
FIG. 6C illustrates an embodiment of determining aggregate QoE metrics on a dimension.

FIG. 6C illustrates an embodiment of determining aggregate QoE metrics on a dimension. In this example, VSF and rebuffering ratio (RBR) are computed on the CDN dimension. In this example, at stage 680, the individual VSF and RBR metrics for each of sessions 672-678 are computed. A mapping of the session to a CDN group (either <Akamai> or <Level3>) is also performed. At stage 682, the individual session metrics are shuffled and stored together according to which CDN they belong to. The individual session metrics for a given CDN are then merged together to compute aggregate VSF and RBR across the sessions that streamed from the given CDN.

Example Alerts Reporting and Investigation Interfaces

Various reports may be provided by reporting engine 228 in response to the detection of anomalies and the diagnosis of a root cause of anomalies. Examples of reports and investigation interfaces are described in further detail below.

Figure 7:
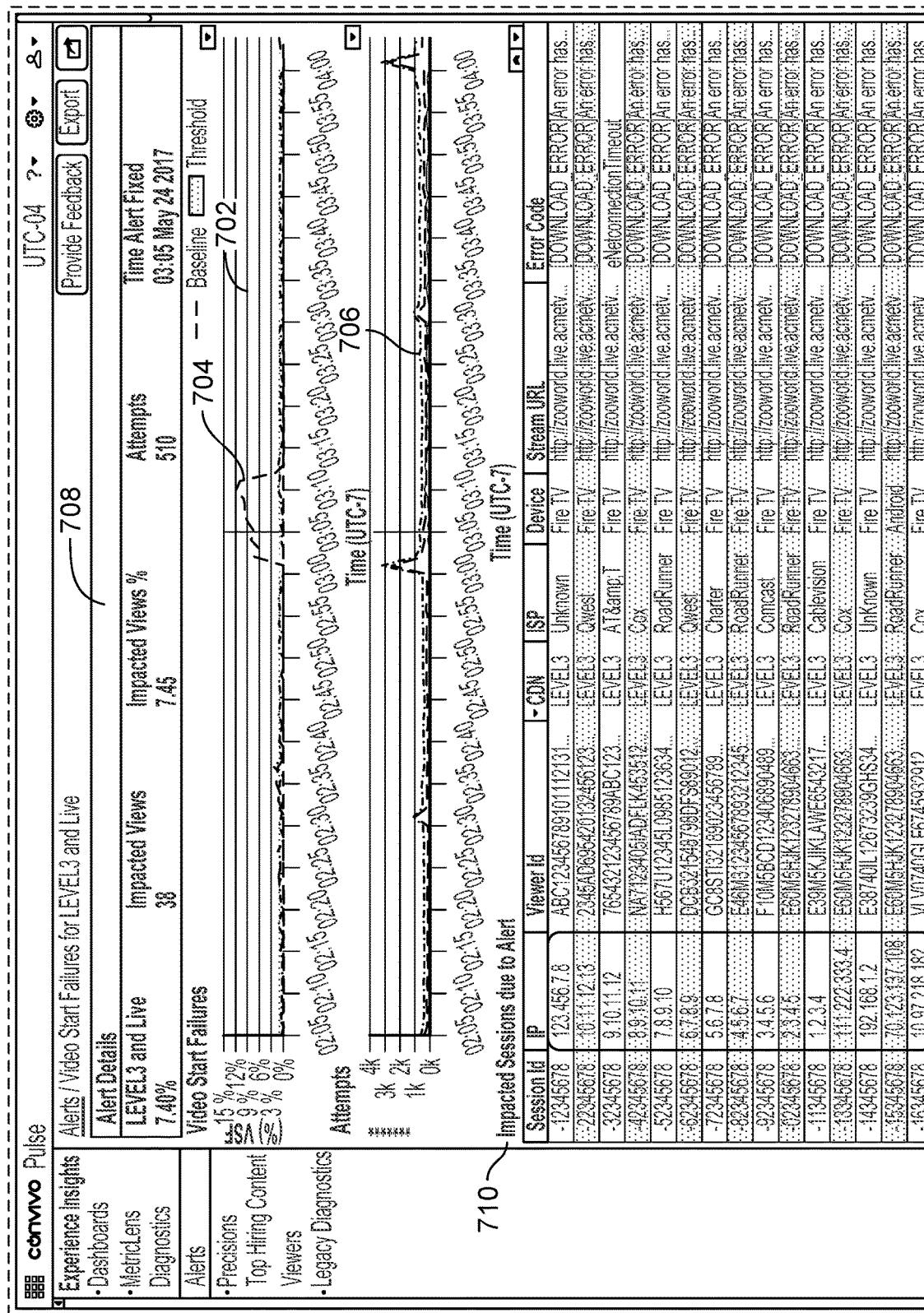
FIG. 7 illustrates an embodiment of an interface for reporting anomalies and root causes.

FIG. 7 illustrates an embodiment of an interface for reporting anomalies and root causes. In this example, a CDN issue was identified in the live traffic of the Level3 CDN for a video publisher. The plot 702 is the time series of the group identified as the root cause. There is a spike in the middle at 704, which indicates an anomaly was detected in video start failures.

As shown in this example, all traffic excluding the root cause group can also be shown. The second line (706) is the time series of other traffic, which as shown in this example, at the time of the anomaly 704, is smooth, without any spikes. This indicates that the root cause of the issue has been clearly identified, otherwise the second line (706) would also show spikes or anomalies at the time of the anomaly 704.

In this example report of FIG. 7, the amount of traffic (e.g., number of views or streaming sessions) for the root cause group is also shown at (708) to indicate the impact of the issue. A sample list of sessions impacted by the issue is also shown at 710, which allows the video publisher to identify the Internet Protocol (IP address), region, streamURL, as well as other attributes on which the user or publisher can take action.

FIG. 8 illustrates an embodiment of a reporting interface for a particular content publisher. In this example, alerts for metrics are shown at column 802. The value for each metric for each alert is shown at column 804. The root cause identified for each alert for the metric is shown at column 806. The cumulative impacted unique devices for each detected issue is shown at 808. The time that alerts were fired is shown at 810.

Figure 9A:
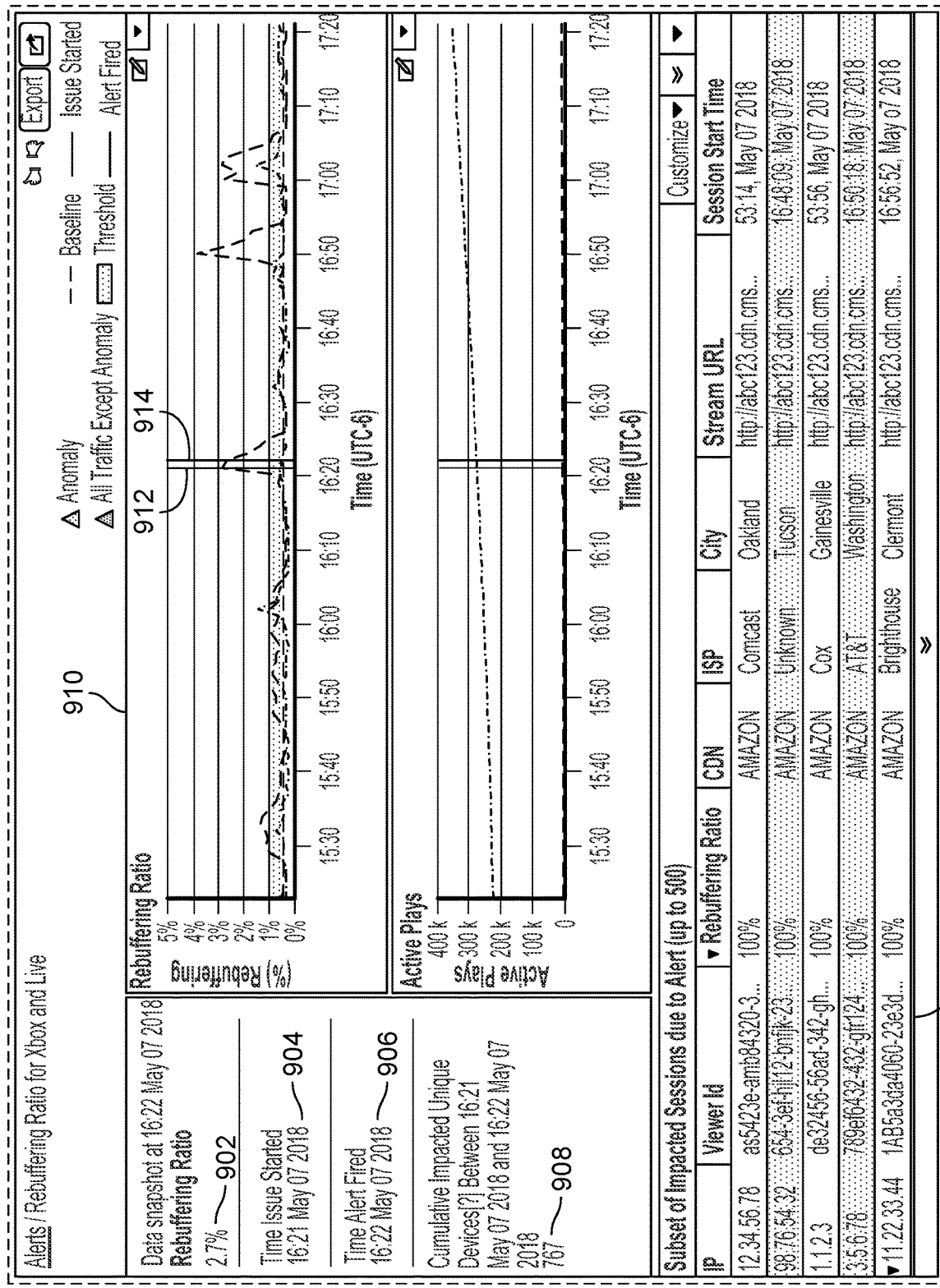
FIG. 9A illustrates an embodiment of a diagnosis interface.

FIG. 9A illustrates an embodiment of a diagnosis interface. Shown in this example is an alert for rebuffering ratio for Xbox (type of device) and Live (type of content). The rebuffering ratio of the detected anomaly is shown at 902. The time at which the issue started is shown at 904. The time at which the alert was fired is shown at 906. The cumulative number of impacted devices between the time the issue started and when the alert was fired is shown at 908. Portion 910 of the reporting interface includes a plot of the time series of rebuffering ratio for the identified root cause group <Xbox, Live>, as well as a plot of the time series of all traffic except the anomaly root cause group. Graphical representations of the time at which the issue started and when the alert were fired are also shown at 912 and 914, respectively. Portion 910 also includes a plot of the baseline and threshold. At 916, information about a subset of impacted sessions due to the alert/identified issue is presented.

Figure 9B:
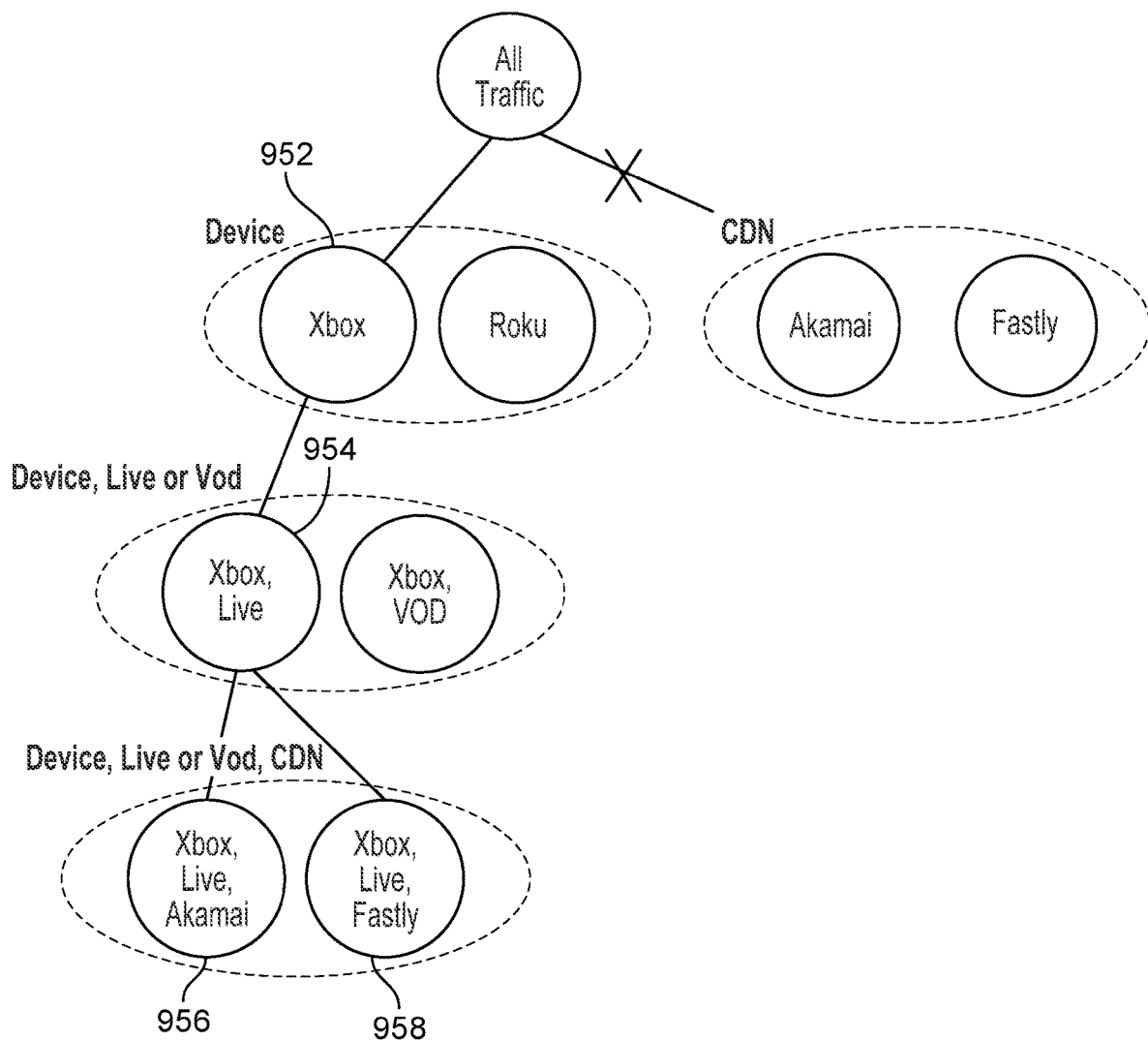
FIG. 9B illustrates an embodiment of a portion of a diagnosis graph.

FIG. 9B illustrates an embodiment of a diagnosis graph. The (partial) diagnosis graph of FIG. 9B was traversed, as described above, to determine the root cause group of <Xbox, Live> reported in the interface of FIG. 9A. In this example, anomalies were detected at nodes 952, 954, 956, and 958 in the diagnosis graph of FIG. 9B (note that the graph of FIG. 9B does not show the complete graph for diagnosis. It only shows the anomaly groups in corresponding dimensions). In this example, the root cause was determined (based on a traversal of the graph, as described above) to be <Xbox, Live> (954) because all of its subgroups (956 and 958) were anomalous as well.

Figure 10A:
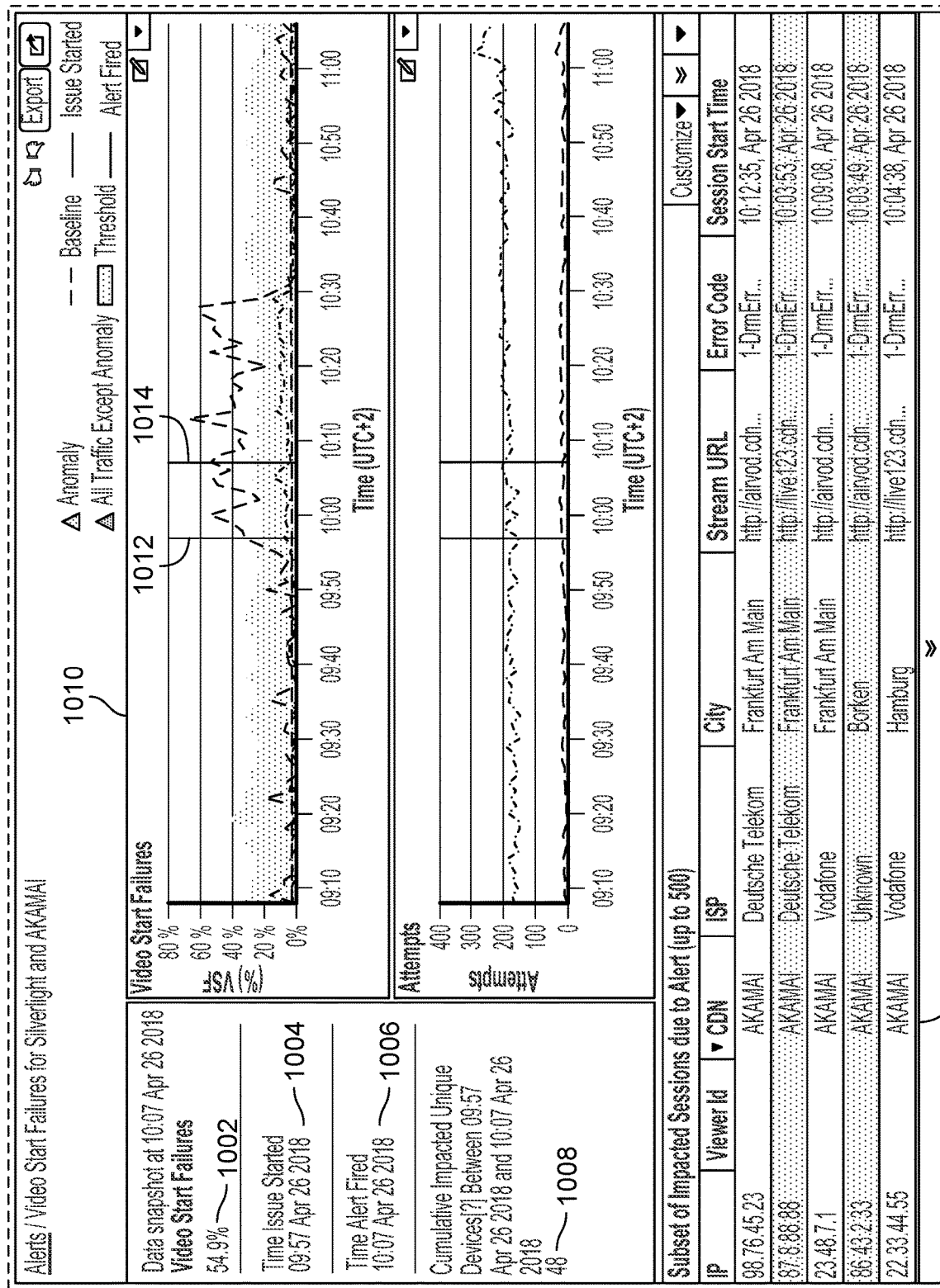
FIG. 10A illustrates an embodiment of a diagnosis interface.

FIG. 10A illustrates an embodiment of a diagnosis interface. Shown in this example is an alert for video start failures for Silverlight (type of device) and Akamai (type of CDN). The percentage of video start failures of the detected anomaly is shown at 1002. The time at which the issue started is shown at 1004. The time at which the alert was fired is shown at 1006. The cumulative number of impacted devices between the time the issue started and when the alert was fired is shown at 1008. Portion 1010 of the reporting interface includes a plot of the time series of rebuffering ratio for the identified root cause group <Sliverlight, Akamai>, as well as a plot of the time series of all traffic except the anomaly root cause group. Graphical representations of the time at which the issue started and when the alert were fired are also shown at 1012 and 1014, respectively. Portion 1010 also includes a plot of the baseline and threshold. At 1016, information about a subset of impacted sessions due to the alert/identified issue is presented.

Figure 10B:
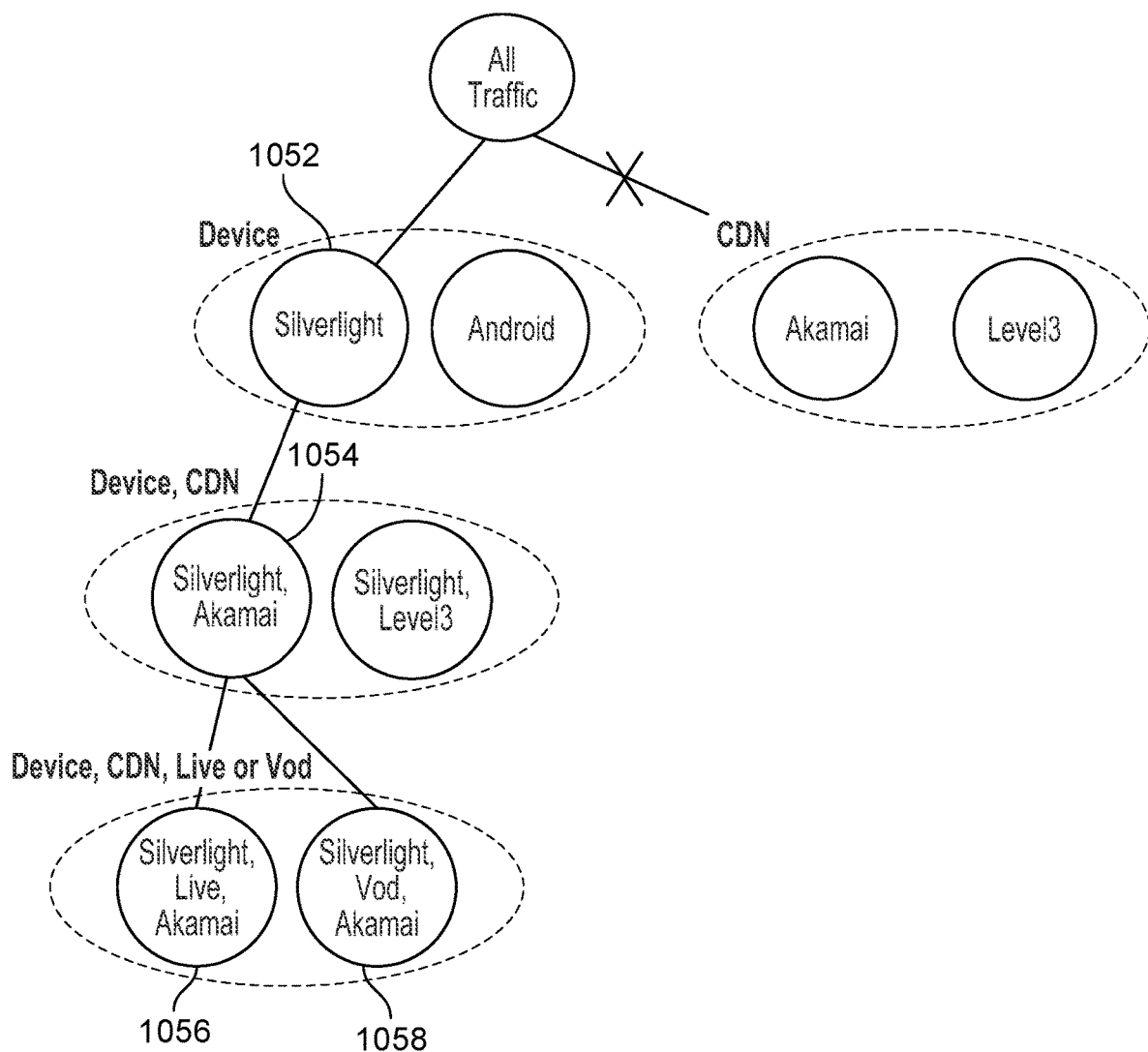
FIG. 10B illustrates an embodiment of a diagnosis graph.

FIG. 10B illustrates an embodiment of a diagnosis graph. The (partial) diagnosis graph of FIG. 10B was traversed, as described above, to determine the root cause group of <Silverlight, Akamai> reported in the interface of FIG. 10A. In this example anomalies were detected at nodes 1052, 1054, 1056, and 1058 in the diagnosis graph of FIG. 10B (note that the graph of FIG. 10B does not show the complete graph for diagnosis. It only shows the anomaly groups in corresponding dimensions). In this example, the root cause was determined (based on a traversal of the graph, as described above) to be <Silverlight, Akamai> (1054) because all of its subgroups (1056 and 1058) were anomalous as well.

Figure 11:
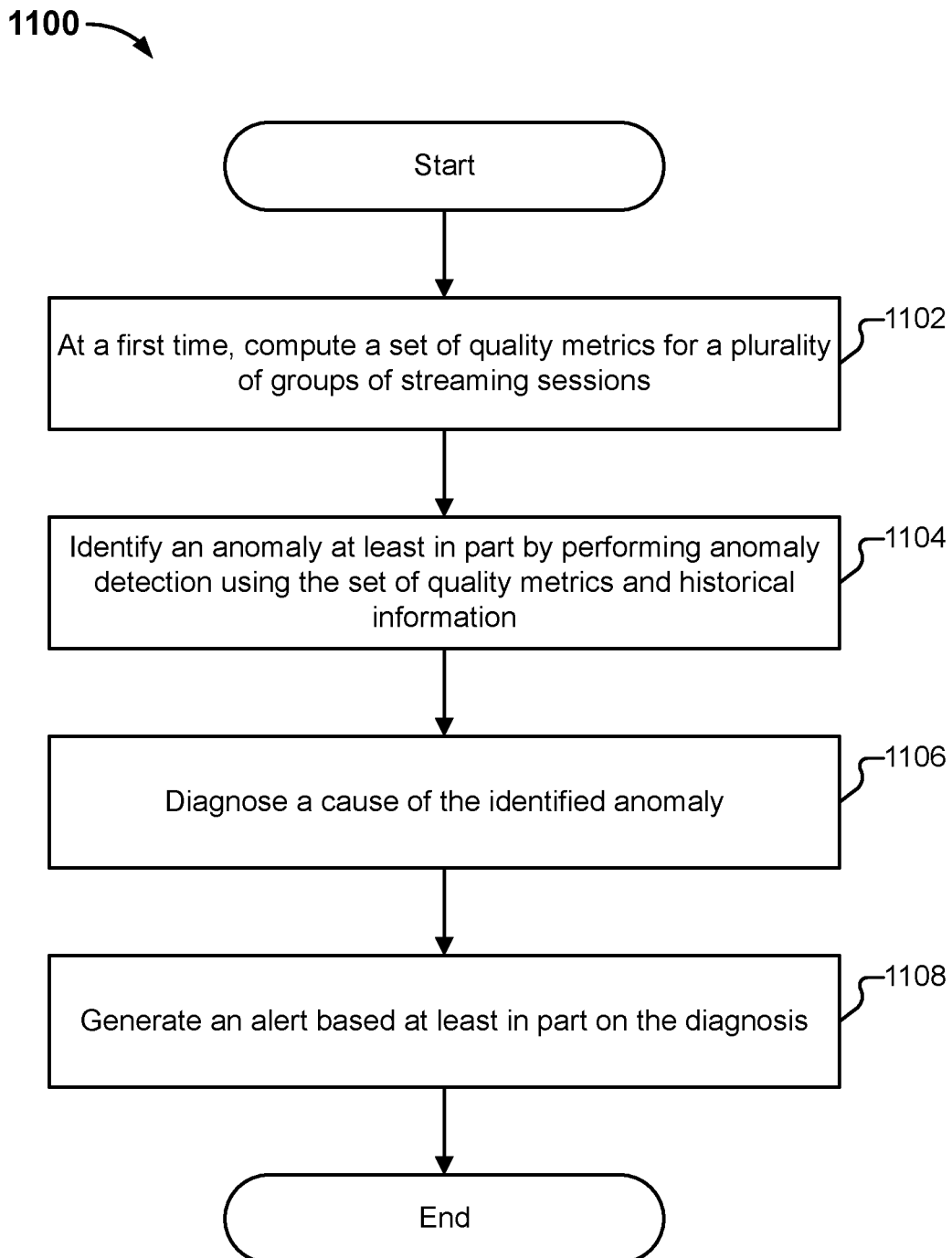
FIG. 11 is a flow diagram illustrating an embodiment of a process for anomaly detection and root cause diagnosis.

FIG. 11 is a flow diagram illustrating an embodiment of a process for anomaly detection and root cause diagnosis. In some embodiments, process 1100 is executed by automatic alerts engine 220 of FIG. 2. The process begins at 1102 when, at a first time, a set of quality metrics are computed for a plurality of groups (of streaming sessions). For example, a set of Quality of Experience (QoE) metrics such as video start failure, exits before video start, video startup time, rebuffering ratio, etc. are computed continuously (e.g., at each minute or any other interval/granularity of time, as appropriate) for various groupings of streaming sessions. The example QoE metrics are used to aggregate the quality of experience from collected video session data (data collected in the last minute), which is sent by monitoring sensors integrated in client devices requesting and playing content. The metrics are computed for various groups of sessions, where the sessions are grouped at varying levels of granularity according to various combinations of dimensional attributes. For example, in various embodiments, sessions may be grouped according to their geo-locations (e.g., state, city, or Designated Market Area (DMA) in the United States), device type, as well as combinations of geo-location and device type. Other examples of dimensions that may be used for grouping sessions include: the name of a video asset that was played; the CDN from which the video data is streamed; whether the content is live or VoD (Video on Demand); and a user's or viewer's Internet Service Provider (ISP), or Autonomous System Number (ASN) within a given ISP.

At 1104, an anomaly is identified at least in part by performing anomaly detection using the computed set of quality metrics and historical information. In some embodiments, the QoE metric computed for the current minute is joined with historical aggregate values for the metric to construct a time series, where the time series per metric per group are evaluated to detect anomalies in the behavior of the time series. Anomalies may be identified in the time series of multiple groups. In one embodiment, a baseline and threshold are used to detect anomalies. For example, a baseline and deviation/tolerance threshold is computed for each QoE metric and group, for example, by aggregating QoE metrics from an extended period of time in which the metric appeared "normal" (e.g., as compared to some threshold value for a metric). As one example, the baseline is the mean of the aggregated QoE metrics within the time period and the threshold is computed as a multiple of the standard deviation plus the baseline value.

The deviation/tolerance threshold is then used to detect issues or anomalies for each QoE metric (time series) and group. For example, if the QoE metric of the corresponding group at the current interval, or aggregated within a short period of time, is above the tolerance threshold for a threshold amount of time, then the metric for the group is labeled as anomalous. In some embodiments, the impact (e.g., the number of sessions impacted by the anomaly) of the issue is also used as a criteria for determining of the metric for a group is anomalous. For example, in addition to the metric exceeding the tolerance threshold for the threshold amount of time, the metric for the group is labeled as anomalous if a threshold number of sessions are impacted by the issue.

In another embodiment of anomaly detection, a hidden Markov model (HMM) is used to detect whether a metric for a group is anomalous at the current time. In some embodiments, a separate HMM is used for each QoE metric and group. In this example, an HMM is a chain of states, one per interval (e.g., each minute), with an associated metric observation for each interval. The state for the interval is a label to be inferred by the HMM, as either "anomalous" or "ordinary" (not anomalous). These states are hidden, and the HMM is used to infer these states using the observations of the metrics. The states are distinguished by the model for observations, which makes different predictions for metrics observed under the ordinary and anomalous states. If observations appear incompatible with the ordinary state for some stretch of time (e.g., the observations are extremely unlikely to happen under the ordinary state), the model finds a high probability that the group is in the anomalous state for that period, and thus the metric for the group is labeled as anomalous.

At 1106, a cause of the identified anomaly is diagnosed. In some embodiments, a graph (e.g., directed acyclic graph (DAG)) is constructed out of all of the groups based on the parent/child relationship between the groups. A group represents the collection of video sessions defined by the dimension for that group. For example, a group (CDN: Akamai, Device:AppleTV) may be constructed to represent all the video sessions that are playing video on an Apple TV device type and obtaining video from the Akamai CDN. In some embodiments, a group "A" is considered a parent of group "B" if "B" contains and matches all the dimensions of group "A" and has one or more dimensions than "A." For example, (CDN:Akamai, Device:AppleTV) is a parent of (CDN:Akamai, Device:AppleTV, ContentType:Live). Other examples of dimensions and groupings are described above. In some embodiments, the graph is constructed using a subset of the groups, where certain dimensions/combinations of dimensions are excluded to reduce the complexity of the diagnosis graph and its evaluation.

The root cause is diagnosed by performing a traversal of the constructed graph. For example, a Breadth First Search (BFS) traversal of the graph is started to look for root causes. One example criteria for a node to be a root cause is that the node itself is labeled as anomalous (e.g., using the issue detection algorithms described above), and more than a configurable (threshold) percentage (e.g., 80%) of children are labeled as anomalous as well. In some embodiments, if a node satisfies the criteria, the system labels the node as a root cause and moves forward to the next node on the BFS path. In some embodiments, if a node is anomalous but does not meet the criteria (e.g., the threshold percentage of children that are labeled as anomalous is not met), the system starts Depth First Search (DFS) traversal from that node through its children until a root cause is identified using the same criteria.

At 1108, an alert is generated based at least in part on the diagnosis. For example, the metric and group that is diagnosed as the root cause is provided. A list of impacted video sessions may also be provided. Other examples of alerts and reports are described above.

Thus, using the techniques described herein, content publishers (or any other entity in the OTT ecosystem/pipeline, as appropriate) may be automatically alerted, in real-time and near real-time, to any issues in viewing quality, as well as be provided the root causes of the detected issues. This provides automatic alerting on problems affecting viewing experience, which has become increasingly important to content publishers due to the rapid growth of video streaming over the Internet (e.g., over-the-top content (OTT)). Existing solutions typically leave the diagnosis of an issue's root cause to content publishers. This is a difficult and time consuming task, since the issue can be at any component in the streaming pipeline (for which there is no single end-to-end owner), and can cause significant delay in finding the root cause and resolving the issue.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
compute a set of quality metrics for a plurality of groups of streaming sessions, wherein the set of quality metrics comprises at least one of video start failure, exits before video start, video startup time, or rebuffering ratio;
identify an anomaly in at least one group of streaming sessions at least in part by performing anomaly detection using the set of quality metrics and historical information, wherein the identifying comprises using a hidden Markov model to determine, based on an observed quality metric over an interval of time for streaming sessions in a given group of streaming sessions, a probability that the given group of streaming sessions is in an anomalous state;
construct a diagnosis graph, wherein each node in the diagnosis graph corresponds to a group of streaming sessions;
diagnose a cause of the identified anomaly at least in part by traversing the diagnosis graph; and
generate an alert based at least in part on the diagnosis; and
a memory coupled to the one or more processors and configured to provide the one or more processors with instructions.

2. The system of claim 1, wherein the set of quality metrics comprises aggregated Quality of Experience (QoE) metrics computed per group of streaming sessions collected within an interval of time.

3. The system of claim 1, wherein the group of streaming sessions represents a set of streaming sessions defined by a set of dimensions comprising at least one of state, city, designated market area (DMA), device type, name of a content asset, content delivery network (CDN), content type, Internet Service Provider (ISP), and autonomous system number (ASN).

4. The system of claim 1, wherein the one or more processors are is further configured to construct a time series using the set of quality metrics and the historical information, and wherein the historical information comprises a set of quality metrics computed at a previous time.

5. The system of claim 1, wherein traversing the constructed diagnosis graph comprises performing a breadth first search (BFS) traversal of the diagnosis graph.

6. The system of claim 1, wherein a node in the diagnosis graph is diagnosed as the cause of the identified anomaly based at least in part on determining that the node is anomalous and that a threshold amount of children of the node are anomalous.

7. The system of claim 1, wherein in response to determining that a node is anomalous and that a threshold number of anomalous children is not met, a depth first search (DFS) is performed starting from the node.

8. The system of claim 1, wherein a plurality of causes is identified based at least in part on the traversing of the constructed diagnosis graph, and wherein the one or more processors are further configured to resolve the plurality of causes into the diagnosed cause of the identified anomaly.

9. The system of claim 1, wherein the diagnosis graph comprises a directed acyclic graph.

10. The system of claim 1, wherein the cause comprises the given group of streaming sessions in the plurality of groups of streaming sessions.

11. The system of claim 1, wherein generating the alert comprises providing a report as output, and wherein the report comprises a list of streaming sessions impacted by the identified anomaly.

12. A method, comprising:
computing a set of quality metrics for a plurality of groups of streaming sessions, wherein the set of quality metrics comprises at least one of video start failure, exits before video start, video startup time, or rebuffering ratio;
identifying an anomaly in at least one group of streaming sessions at least in part by performing anomaly detection using the set of quality metrics and historical information, wherein the identifying comprises using a hidden Markov model to determine, based on an observed quality metric over an interval of time for streaming sessions in a given group of streaming sessions, a probability that the given group of streaming sessions is in an anomalous state;
constructing a diagnosis graph, wherein each node in the diagnosis graph corresponds to a group of streaming sessions;
diagnosing a cause of the identified anomaly at least in part by traversing the diagnosis graph; and
generating an alert based at least in part on the diagnosis.

13. A computer program product embodied in a non-transitory computer readable storage medium and comprising computer instructions for:
computing a set of quality metrics for a plurality of groups of streaming sessions, wherein the set of quality metrics comprises at least one of video start failure, exits before video start, video startup time, or rebuffering ratio;
identifying an anomaly in at least one group of streaming sessions at least in part by performing anomaly detection using the set of quality metrics and historical information, wherein the identifying comprises using a hidden Markov model to determine, based on an observed quality metric over an interval of time for streaming sessions in a given group of streaming sessions, a probability that the given group of streaming sessions is in an anomalous state;
constructing a diagnosis graph, wherein each node in the diagnosis graph corresponds to a group of streaming sessions;
diagnosing a cause of the identified anomaly at least in part by traversing the diagnosis graph; and
generating an alert based at least in part on the diagnosis.

14. The method of claim 12, wherein the set of quality metrics comprises aggregated Quality of Experience (QoE) metrics computed per group of streaming sessions collected within an interval of time.

15. The method of claim 12, wherein the group of streaming sessions represents a set of streaming sessions defined by a set of dimensions comprising at least one of state, city, designated market area (DMA), device type, name of a content asset, content delivery network (CDN), content type, Internet Service Provider (ISP), and autonomous system number (ASN).

16. The method of claim 12, further comprising constructing a time series using the set of quality metrics and the historical information, and wherein the historical information comprises a set of quality metrics computed at a previous time.

17. The method of claim 12, wherein traversing the constructed diagnosis graph comprises performing a breadth first search (BFS) traversal of the diagnosis graph.

18. The method of claim 12, wherein a node in the diagnosis graph is diagnosed as the cause of the identified anomaly based at least in part on determining that the node is anomalous and that a threshold amount of children of the node are anomalous.

19. The method of claim 12, wherein in response to determining that a node is anomalous and that a threshold number of anomalous children is not met, a depth first search (DFS) is performed starting from the node.

20. The method of claim 12, wherein a plurality of causes is identified based at least in part on the traversing of the constructed diagnosis graph, and further comprising resolving the plurality of causes into the diagnosed cause of the identified anomaly.

21. The method of claim 12, wherein the diagnosis graph comprises a directed acyclic graph.

22. The method of claim 12, wherein the cause comprises the given group of streaming sessions in the plurality of groups of streaming sessions.

23. The method of claim 12, wherein generating the alert comprises providing a report as output, and wherein the report comprises a list of streaming sessions impacted by the identified anomaly.

* * * * *

UNITED STATES PATENT AND TRADEMARK OFFICE
CERTIFICATE OF CORRECTION

PATENT NO. : 12,250,259 B2
APPLICATION NO. : 18/229483
DATED : March 11, 2025
INVENTOR(S) : Yan Li et al.

It is certified that error appears in the above-identified patent and that said Letters Patent is hereby corrected as shown below:

In the Drawings

In sheet(s) 7 of 16, figure 6A, block 612, Executor1, after "(c1, Desktop, L3)", delete ",".

In sheet(s) 7 of 16, figure 6A, block 612, Executor2, after "(c2, Desktop, L3)", delete ",".

In sheet(s) 8 of 16, figure 6B, block 654, Partition1, before "merged_BufferingRatio2, merged_VST2)", delete "(".

In sheet(s) 8 of 16, figure 6B, block 654, Partition2, before "merged_BufferingRatio1, merged_VST1)", delete "(".

In the Specification

In Column 4, Line(s) 26, delete "has" and insert --is--, therefor.

In Column 5, Line(s) 37, after "whether", delete ",".

In Column 7, Line(s) 33, delete "2'=8" and insert --2^3 = 8--, therefor.

In Column 9, Line(s) 41, after "anomalous", delete "," and insert --.--, therefor.

In Column 15, Line(s) 30, after "there", insert --are--.

In Column 16, Line(s) 57, after "occur", delete "for".

In Column 19, Line(s) 5, delete "<device, ISP" and insert --<device, ISP>--, therefor.

In Column 19, Line(s) 13, delete "dimension" and insert --dimensions--, therefor.

Signed and Sealed this
Twenty-ninth Day of July, 2025

Coke Morgan Stewart
*Acting Director of the United States Patent and Trademark Office*

CERTIFICATE OF CORRECTION (continued)
U.S. Pat. No. 12,250,259 B2

In Column 19, Line(s) 21, after "below)", insert --.--.

In Column 19, Line(s) 25, after "examples", delete "of".

In Column 21, Line(s) 16, delete "corresponds" and insert --correspond--, therefor.

In Column 24, Line(s) 23, delete "were" and insert --was--, therefor.

In Column 24, Line(s) 50 & 51, delete "<Sliverlight, Aka-mai>," and insert --<Silverlight, Akamai>,--, therefor.

In Column 24, Line(s) 53, delete "were" and insert --was--, therefor.

In Column 25, Line(s) 59, after "determining", delete "of" and insert --if--, therefor.

In the Claims

In Column 27, Line(s) 50, Claim 4, after "are", delete "is".